(12) United States Patent
Kawamura

(10) Patent No.: US 6,324,018 B1
(45) Date of Patent: Nov. 27, 2001

(54) ZOOM LENS SYSTEM

(75) Inventor: Kazuteru Kawamura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/532,309

(22) Filed: Mar. 22, 2000

(30) Foreign Application Priority Data

Mar. 23, 1999 (JP) .................................................. 11-077667

(51) Int. Cl.⁷ .................................................. G02B 15/14
(52) U.S. Cl. .................................................. 359/687
(58) Field of Search .................................................. 359/683, 687, 359/676

(56) References Cited

U.S. PATENT DOCUMENTS

| 4,256,381 | 3/1981 | Kreitzer . |
| 4,299,454 | 11/1981 | Betensky . |

FOREIGN PATENT DOCUMENTS

| 58-078114 A | 5/1983 | (JP) . |
| 58-224323 A | 12/1983 | (JP) . |
| 59-164517 A | 9/1984 | (JP) . |
| 62-270910 A | 11/1987 | (JP) . |
| 63-70819 A | 3/1988 | (JP) . |
| 3-29912 A | 2/1991 | (JP) . |
| 4-208911 A | 7/1992 | (JP) . |
| 5-173070 A | 7/1993 | (JP) . |
| 6-75167 A | 3/1994 | (JP) . |
| 6-337354 A | 12/1994 | (JP) . |
| 8-43736 A | 2/1996 | (JP) . |
| 8-086963 A | 4/1996 | (JP) . |
| 9-5629 A | 1/1997 | (JP) . |

Primary Examiner—Scott J. Sugarman
(74) Attorney, Agent, or Firm—Pillsbury Winthrop LLP

(57) ABSTRACT

A zoom lens system comprising a first positive lens unit, a second negative lens unit, a third positive lens unit and a fourth positive lens unit: the second lens unit consisting of a first negative lens component, a second negative lens component, a third positive lens component and a fourth negative lens component; the third lens unit comprising a positive lens component disposed on the object side and a negative lens component disposed on the image side; and the fourth lens unit consisting of a front subunit and a rear subunit comprising a positive lens element, a negative lens element and an air lens which is formed between these lens elements so as to have a meniscus shape convex toward the image side, whereby the zoom lens system satisfies the following conditions (1) and (2):

(1) $0.16 < |f_2|/f_1 < 0.23$ (2) $5 < h \times z / \Delta D_{34} < 27$

This zoom lens system is compact and has a high vari-focal ratio exceeding 6.

14 Claims, 15 Drawing Sheets

ZOOM LENS SYSTEM

BACKGROUND OF THE INVENTION a) Field of the Invention

The present invention on relates to a compact zoom lens system which has a high vari-focal ratio.

b) Description of the Prior Art

To obtain a compact zoom lens system which has a high vari-focal ratio, it is effective to compose a lens system, in order from the object side, of a first lens unit having positive refractive power, a second lens unit having negative refractive power, a third lens unit having positive refractive power and a fourth lens unit having positive refractive power, and configure the lens system so as to change a magnification by moving the lens units.

As conventional examples of such a type of zoom lens system, there are known lens systems disclosed as fourth and sixth embodiments of Japanese Patent Kokai Publication No. Sho 58-78114, lens systems disclosed as first through fourth embodiments of Japanese Patent Kokai Publication No. Sho 58-224323, a lens system disclosed as a third embodiment of Japanese Patent Kokai Publication No. Sho 59-164517, lens systems disclosed as first through fifth embodiments of Japanese Patent Kokai Publication No. Sho 63-70819, a lens system disclosed as a second embodiment of Japanese Patent Kokai Publication No. Hei 3-29912, a lens system disclosed as a first embodiment of Japanese Patent Kokai Publication No. Hei 4-208911, a lens system disclosed as a second embodiment of Japanese Patent Kokai Publication No. Hei 5-173070, a lens system disclosed as a third embodiment of Japanese Patent Kokai Publication No. Hei 6-75167, a lens system disclosed as a first embodiment of Japanese Patent Kokai Publication No. Hei 8-43736, lens systems disclosed as first through third embodiments of Japanese Patent Kokai Publication No. Hei 6-337354, lens systems disclosed as first through eighth embodiments of U.S. Patent Publication No. 4256381 and a lens system disclosed as a fourth embodiment of U.S. Patent Publication No. 4299454.

However, the zoom lens systems quoted as the conventional examples have vari-focal ratios lower than 5 and cannot be said as zoom lens systems which have sufficiently high vari focal ratios, and it is difficult to further enhance the vari focal ratios of these zoom lens systems.

Furthermore, lens systems disclosed as first through fourth embodiments of Japanese Patent Kokai Publication No. Sho 62-270910 have high vari-focal ratios which are higher than 5, but a field angle of 64° at a wide position which is not large and it is difficult to further enlarge the field angle.

Furthermore, a zoom lens system disclosed by Japanese Patent Kokai Publication No. Hei 8-86963 has a high vari-focal ratio which is 6 or higher, but uses an aperture stop disposed in an airspace as narrow as 0.03 mm to 0.21 mm which is varied for changing a magnification and reserved between a final lens element of a second lens unit and a first lens element of a third lens unit. This airspace must be at least 0.4 mm in an actual product. In other words, the lens elements may be brought into contact with the aperture stop dependently on variations of parts. Even if the zoom lens system can be assembled into the product, the lens system is hardly assembled, thereby constituting a cause for an enhanced manufacturing cost.

Furthermore, a zoom lens system disclosed by Japanese Patent Kokai Publication No. Hei 9-5629 has a high vari-focal ratio which is not lower than 6, first through third embodiments of this conventional example cause remarkable variations of image surfaces by changing magnification and have optical performance which is not favorable. Moreover, a zoom lens system preferred as a fourth embodiment of this conventional example exhibits favorable optical performance at wide, standard and tele positions, but unbalances spherical aberration, curvature of field and distortion at an intermediate focal length which is located on a side of the tele position from the standard position and cannot correct these aberrations at the same time. In addition, a zoom lens system preferred as a fifth embodiment of this conventional example produces remarkable distortion on the side of the tele position.

SUMMARY OF THE INVENTION

A primary object of the present invention is to provide a zoom lens system characterized in: that it has a fundamental composition wherein the zoom lens system comprises, in order from the object side, a first lens unit having positive refractive power, a second lens unit having negative refractive power, a third lens unit having positive refractive power and a fourth lens unit having positive refractive power, a magnification at the wide position is changed to a magnification at the tele position by moving the first lens unit toward the object side, moving the second lens unit so as to widen an airspace reserved between the first lens unit and the second lens unit, moving the third lens unit so as to narrow an airspace reserved between the second lens unit and the third lens unit and moving the fourth lens unit so as to reserve an airspace between the third lens unit and the fourth lens unit at the tele position which is narrower than an airspace at the wide position, the second lens unit comprises, in order from the object side, a first lens component having negative refractive power, a second lens component having negative refractive power, a third lens component having positive refractive power and a fourth lens component having negative refractive power, a lens component having positive refractive power is disposed on the most object side and a negative lens component is disposed on the most image side in the third lens unit, the fourth lens unit comprises a front subunit and a rear subunit, the front subunit has positive refractive power and the rear subunit comprises a positive lens element and a negative lens element, an air lens having meniscus shape convex toward the image side is formed between the positive lens element and the negative lens element and the first lens unit and the second lens unit satisfy the conditions (1) mentioned below; and that the zoom lens system satisfies the following condition (2):

(1) $0.16 < |f_2|/f_1 < 0.23$ (2) $5 < h \times z/\Delta D_{43} < 27$

Furthermore, the zoom lens system according to the present invention which has the fundamental composition described above is characterized by satisfying the following conditions (3) or (4) and (5):

(3) $0.09 < D_4/h < 0.6$ (4) $0.6 < f_{4F}/f_4 < 1.8$ (5) $4 < f_{4F}/D_4 < 35$

Furthermore, the zoom lens system according to the present invention which has the fundamental composition described above is characterized in that the front subunit of the fourth lens unit consists of a positive lens element which has a convex surface on the object side and positive refractive power.

Furthermore, the zoom lens system according to the present invention which has fundamental composition described above is characterized in that the front subunit of the fourth lens unit consists of a lens having positive refractive power which is convex toward the object side and a negative lens element which is disposed after the lens element having the positive refractive power at a location close thereto, and that surfaces of the lens element having the positive refractive power and the negative lens element which are opposed to each other have radii of curvature of the same sign.

Moreover, the zoom lens system according to the present invention which has the fundamental composition described above is characterized in that the third lens component of the second lens unit is a cemented lens component which consists of a positive lens element and a negative lens element.

Another object of the present invention is to provide a photographing apparatus wherein an optical path splitting means is disposed on the image side of the zoom lens system described above to split an optical path into a photographic optical path and an observing optical path.

DETAILED DESCRIPTION OF THE PREFERRED EMBODIMENTS

Figure 1:
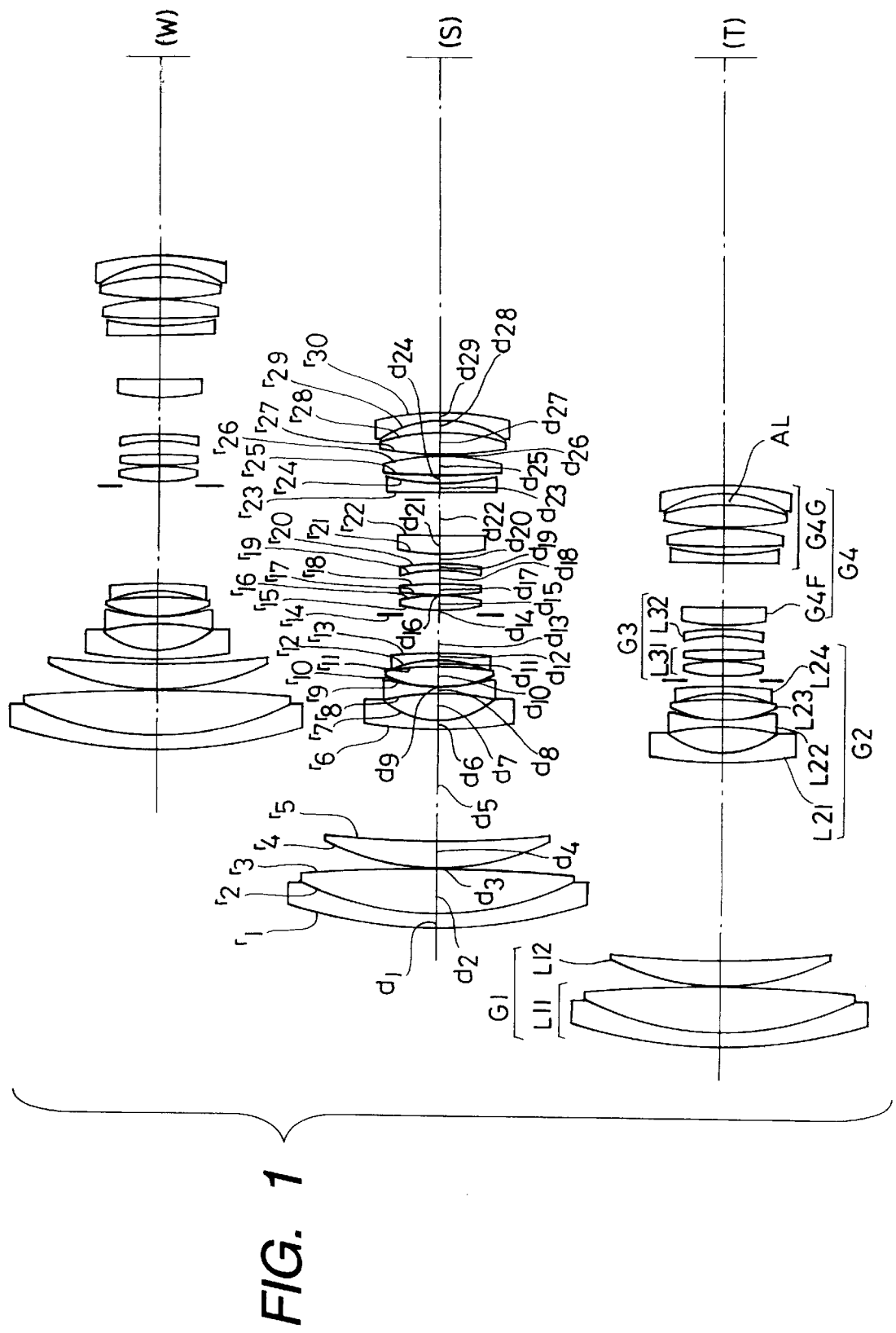
FIGS. 1 through 12 are sectional view illustrating compositions of first through twelfth embodiments of the zoom lens system according to the present invention.
Figure 2:
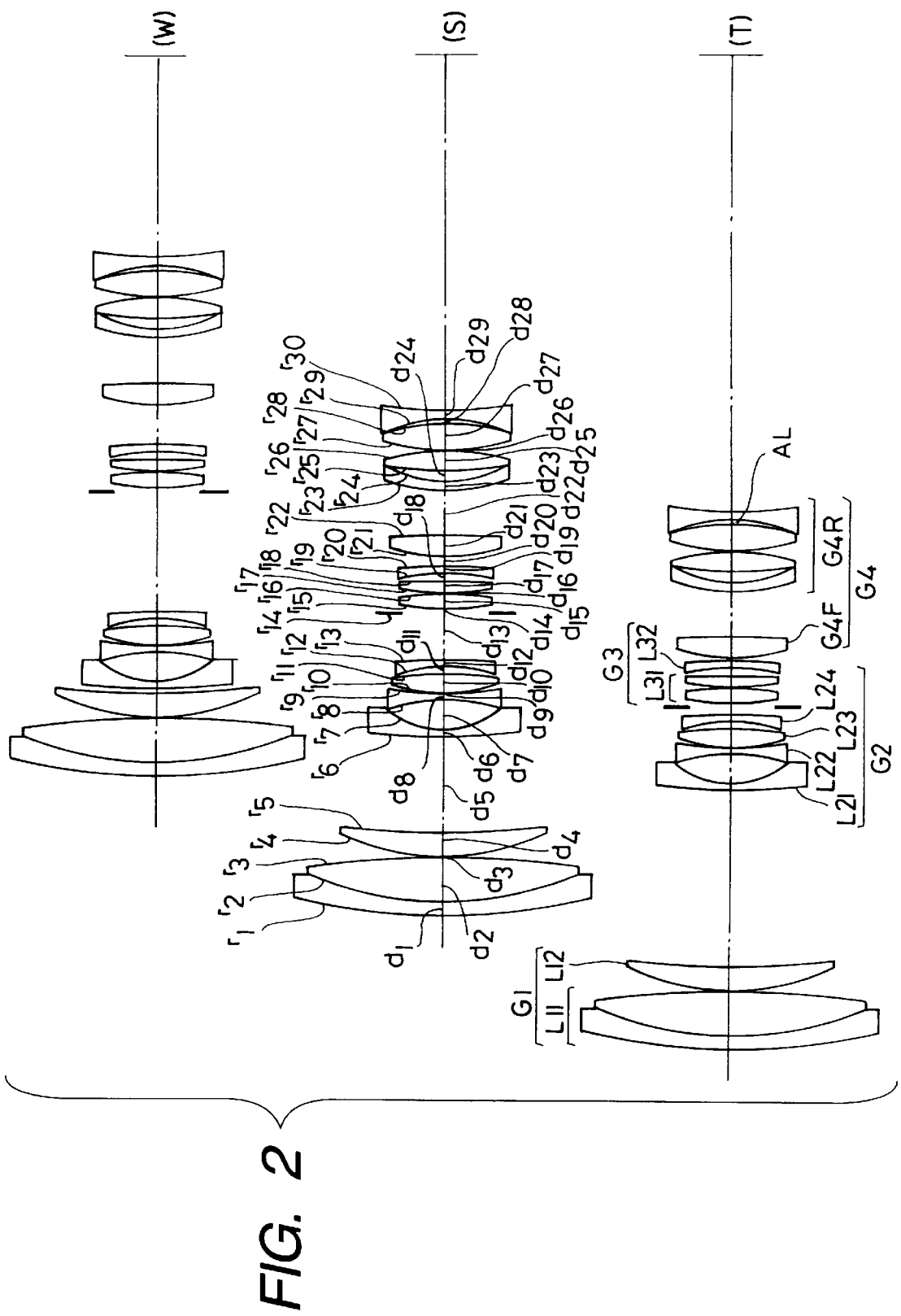

The zoom lens system according to the present invention of a first composition is characterized in: that the zoom lens system has a fundamental composition wherein the lens system comprises, in order from the object side, a first lens unit having positive refractive power, a second lens unit having negative refractive power, a third lens unit having positive refractive power and a fourth lens unit having positive refractive power, a magnification at a wide position is changed to a magnification at a tele position by moving the first lens unit toward the object side, moving the second lens unit so as to widen an airspace reserved between the first lens unit and the second lens unit, moving the third lens unit so as to narrow an airspace reserved between the second lens unit and the third lens unit and moving the fourth lens unit so as to reserve an airspace between the third lens unit and the fourth lens unit at the tele position which is narrower than an airspace at the wide position, the second lens unit comprises four lens components, in order from the object side, of a first lens component having negative refractive power, a second lens component having negative refractive power, a third lens component having positive refractive power and a fourth lens component having negative refractive power which are disposed independently with airspaces reserved therebetween, the third lens unit has a composition wherein a lens component having positive refractive power is disposed on the most object side and a negative lens element is disposed independently on the most image side with airspaces reserved on the object side and the image side respectively, the fourth lens unit consists of a front subunit and a rear subunit, the front subunit has positive refractive power and the rear lens unit comprises a positive lens element, a negative lens element and an air lens formed between the positive lens element and the negative lens element so as to have a meniscus shape convex toward the image side, and the first lens unit and the second lens unit satisfies a condition (1) mentioned below; and that the lens system satisfies the following condition (2):

(1) $0.16 < |f_2|/f_1 < 0.23$ (2) $5 < h \times z/\Delta D_{34} < 27$ wherein a reference symbol $f_1$ represents a focal length of the first lens unit, a reference symbol $f_2$ designates a focal length of the second lens unit, a reference symbol h denotes a maximum image height on an imaging surface, a reference symbol z represents a vari-focal ratio, a reference symbol $\Delta D_{34}$ designates a difference between an airspace between the third lens unit and the fourth lens unit at the wide position and an airspace between the third lens unit and the fourth lens unit at the tele position.

As described above, the zoom lens system according to the present invention comprises, in order from the object side, the first lens unit having the positive refractive power, the second lens unit having the negative refractive power, the third lens unit having the positive refractive power and the fourth lens unit having the positive refractive power, the magnification at the wide position is changed to the magnification at the tele position by moving the first lens unit toward the object side, moving the second lens unit so as to widen the airspace reserved between the first lens unit and the second lens unit, moving the third lens unit so as to narrow the airspace reserved between the second lens unit and the third lens unit, and moving the fourth lens unit so as to reserve the airspace between the third lens unit and the fourth lens unit at the tele position which is wider than that at the wide position, and the first lens unit and the second lens unit satisfy the condition (1) mentioned above.

A zoom lens system which has a field angle 2ω of 68° or larger at a wide position in particular has a higher vari-focal ratio, variations of an image surface and chromatic aberration are more remarkable in an intermediate focal length region in addition to a wide position and a tele position, whereby the zoom lens system can hardly exhibit favorable optical performance.

Accordingly, a first requirement for enhancing the vari-focal ratio is to select an adequate movement and adequate power for each lens unit. The zoom lens system according to the present invention which has the composition described above and satisfies the condition (1) is capable of moving the lens units and a distribute power as required to enhance a vari-focal ratio while maintaining required optical performance at the intermediate focal length region.

Furthermore, the zoom lens system according to the present invention which has the composition described above is characterized in that the second lens unit comprises, in order from the object side, the first lens component having the negative refractive power, the second lens component having the negative refractive power, the third lens component having the positive refractive power and the fourth lens component having the negative refractive power, and satisfies the condition (1) mentioned above.

Since the zoom lens system according to the present invention is configured so that it can have a high vari-focal ratio owing to a vari-focal function enhanced by varying the airspace reserved between the second lens unit and the third lens unit, it is necessary to strengthen the negative refractive power of the second lens unit. When the refractive power of the second lens unit is strengthened, however, distortion will be aggravated mainly at the wide position, and an image surface and lateral chromatic aberration are varied by changing the magnification.

The zoom lens system according to the present invention wherein the second lens unit comprises the first negative lens component, the second negative lens component, the third positive lens component and the fourth negative lens component as described above makes it possible to strengthen the negative refractive power of the second lens unit while suppressing variations of distortion, the image surface and lateral chromatic aberration mentioned above to low levels.

Positive distortion produced by the first lens unit can be corrected effectively by configuring the first lens component of the second lens unit as a negative lens component having strong power. When the negative power of the first lens component is too strong, however, mainly coma and lateral chromatic aberration are remarkably varied by changing the magnification. Variations of coma and lateral chromatic aberration can be reduced by charing the negative power of the first lens component with the second lens component.

Furthermore, the first lens component and the second lens component of the second lens unit produce mainly longitudinal chromatic aberration and as well as spherical aberration and coma in a region near the tele position, but these aberrations can be corrected by the third positive lens component. Furthermore, residual chromatic aberration, spherical aberration and coma can be corrected with good balance by the fourth lens component. Aberrations can be corrected favorably in the lens system by disposing the four first through fourth lens components independently with airspaces interposed as described above.

If a lower limit of 0.16 of the condition (1) mentioned above is exceeded, the second lens unit will have strong power and the aberrations mentioned above cannot be suppressed to the low levels even when the second lens unit has a composition described above. If an upper limit of 0.23 of the condition (1) is exceeded, the lens system will have a large total length, thereby making it difficult to obtain a compact zoom lens system which has a high vari-focal ratio.

Furthermore, it is desirable for the zoom lens system according to the present invention to configure the third lens unit so as to have a composition wherein a lens component having positive refractive power is disposed on the object side and an independent negative lens element is disposed on the image side with airspaces reserved on the object side and the image side.

In order to obtain a zoom lens system which is compact and has a high vari-focal ratio, it is necessary to enhance refractive power of a second lens unit and a third lens unit.

By selecting for the third lens unit the composition wherein the lens component having the positive refractive power is disposed on the object side and the independent negative lens element is disposed on the image side, it is possible to shorten a distance between a rear principal point of the second lens unit and a front principal point of the third lens unit at the tele position, thereby enhancing the vari-focal function.

Furthermore, it is desirable for the zoom lens system according to the present invention to compose the fourth lens unit of the front subunit and the rear subunit, configure the front subunit so as to have positive power, compose the rear subunit of a positive lens element and a negative lens element, and form an air lens having a meniscus shape convex toward the image side between the positive lens element and the negative lens element.

By selecting a composition described above for the fourth lens unit, it is possible to control divergence of rays emerging from the front subunit, and favorably correct spherical aberration and coma produced by the third lens unit with the air lens of the rear subunit while suppressing a variation of distortion caused by changing the magnification. Accordingly, larger amounts of aberrations produced by the third lens unit are allowable and the third lens unit can be composed of a smaller number of lens components. As a result, a manufacturing cost and a total length of the zoom lens system can be reduced and shortened without degrading optical performance of the lens system.

Though the zoom lens system according to the present invention is characterized by the fundamental composition described above, it is also characterized by satisfying the condition (2) to as to be a more favorable zoom lens system.

The condition (2) is required to configure the lens system more compact and correct curvature of field favorably in an entire vari-focal region.

If an upper limit of 27 of the condition (2) is exceeded, a variation of the airspace $D_{34}$ between the third lens unit and the fourth lens unit will be too small for a vari-focal ratio, thereby enlarging a variation of the image surface caused mainly by changing the magnification and making it impossible to maintain favorably optical performance over the entire vari-focal region. If a lower limit of 5 of the condition (2) is exceeded, the airspace between the third lens unit and the fourth lens unit will be too large for the vari-focal ratio and undesirable to maintain favorable optical performance of the lens system or make a total length too large, thereby enlarging the lens system.

Furthermore, the zoom lens system of a second composition is characterized in that it has the fundamental composition described above and satisfies the following condition (3):

(3) $0.09 < D_4/h < 0.6$ wherein a reference symbol $D_4$ represents an airspace between an image side surface of the front subunit and an object side surface of the rear subunit.

The condition (3) is required to shorten a diameter of the fourth lens unit by suppressing divergence of rays emerging from the front subunit, and correct offaxial aberrations such as distortion and coma favorably over the entire vari-focal region.

If an upper limit of 0.6 of the condition (3) is exceeded, variations of the offaxial aberrations such as distortion and coma can be suppressed over the entire vari-focal region, but an outside diameter and a total length of the fourth lens unit will be enlarged, thereby making it impossible to configure the lens system compact. If a lower limit of 0.09 of the condition (3) is exceeded, spherical aberration can be corrected favorably, and the outside diameter and the total length of the fourth lens unit can be small, but the offaxial aberrations will be varied remarkably, thereby making it impossible to obtain favorable optical performance.

Furthermore, the zoom lens system according to the present invention of a third composition is characterized in that it has the fundamental composition described above and satisfies following conditions (4) and (5):

(4) $0.6 < f_{4F}/f_4 < 1.8$ (5) $4 < f_{4F}/D_4 < 35$ wherein a reference symbol $f_4$ represents a focal length of the fourth lens unit and a reference symbol $f_{4F}$ designates a focal length of the front subunit of the fourth lens unit.

The conditions (4) and (5) relate to the fourth lens unit: the condition (4) being required to correct aberrations favorably over the entire vari-focal region and configure the lens system compact.

If an upper limit of 1.8 of the condition (4) is exceeded, offaxial rays will be too high on the rear subunit of the fourth lens unit, thereby enlarging an outside diameter of the fourth lens unit and making it difficult to correct offaxial aberrations of high orders. To correct these aberrations, it is necessary to use a large number of lens components. If a lower limit of 0.6 of the condition (4) is exceeded, in contrast, the outside diameter of the fourth lens unit can be shortened, but a light diverging surface of the fourth lens unit will have a strong diverging function to prolong a back focal length of the lens system (to reserve a desired back focal length), thereby causing the image surface to be varied remarkably by changing the magnification. In addition, spherical aberration of high orders will be produced at the tele position, thereby making it impossible to obtain favorable optical performance.

The condition (5) is required to effectively correct aberrations such as distortion and curvature of field to enhance offaxial performance.

If power of the front subunit is weakened for the airspace $D_4$ between the image side surface of the front subunit and the object side surface of the rear subunit until an upper limit of 35 of the condition (5) is exceeded, a burden on the rear subunit will be heavy to correct the offaxial aberrations, thereby making it difficult to correct aberrations favorably. In addition, the offaxial aberrations will be varied remarkably by changing the magnification. If a lower limit of 4 of the condition (5) is exceeded, the burden on the rear subunit to correct the aberrations will be light and the aberrations can be corrected favorably, but a total length of the lens system will be enlarged, thereby making it difficult to configure the lens system compact.

Furthermore, the zoom lens system according to the present invention of a fourth composition has the fundamental composition described above which permits composing the front subunit of the fourth lens unit of a lens element which is convex toward the object side and has positive power.

When the front subunit of the fourth lens unit is composed of a lens element which is convex toward the object side and has positive power, aberrations can be corrected favorably with this lens element only. Accordingly, the lens system can be manufactured at a lower cost using a reduced number of lens elements.

When the front subunit of the fourth lens unit is to be composed of a lens element, it is desirable to select an Abbe's number $v_d$ of the lens element so as to satisfy the following condition (6):

(6) $v_d > 60$

Chromatic aberration which is produced by the fourth lens unit in a smaller amount makes it possible to reduce spherical aberration of chromatic aberration of high orders at the tele position and flare in the vicinities of the tele position. It is possible to correct chromatic aberration produced in the fourth lens unit by selecting an Abbe's number so as to satisfy the condition (6).

A fifth composition of the zoom lens system according to the present invention is the fundamental composition described above for which it is desirable that the front subunit of the fourth lens unit is composed of a lens element which is convex toward the object side and has positive power and a negative lens element which is disposed after the positive lens element and close thereto, and that radii of curvature on surfaces of the positive lens element and the negative lens element which are opposed to each other have the same sign.

By composing the front subunit of the fourth lens unit as described above, it is possible to favorably correct aberrations with the front subunit of the fourth lens unit composed of a small number of lens elements. Chromatic aberration produced by the front subunit in particular can be make achromatic by the two positive and negative lens elements, thereby reducing the spherical aberration of chromatic aberration of high orders at the tele position and flare in the vicinities of the tele position. When the front subunit is composed of the two positive lens element and negative lens element which are disposed close to each other, curvature of high orders of spherical aberration can be reduced for effective reduction of flare by selecting the radii of curvature of the same sign for the surfaces of the surfaces opposed to each other.

A sixth composition of the zoom lens system according to the present invention is the fundamental composition described above wherein the third lens component of the second lens unit is configured as a cemented lens component (consisting of a positive lens element and a negative lens element).

In the second lens unit of the zoom lens system according to the present invention, the third lens component has a role to correct chromatic aberration produced by the first lens component and the second lens component.

As the zoom lens system has a higher vari-focal ratio, it is more difficult to correct, over the entire van focal region, chromatic aberration, lateral chromatic aberration in particular, which is produced by the third lens component of the second lens unit.

By configuring the third lens component of the second lens unit as a cemented lens component as described above, it is possible to correct chromatic aberration more favorably or sufficiently favorably even at a high vari-focal ratio, and obtain a zoom lens system which has a higher vari-focal ratio.

For the zoom lens system according to the present invention which has any one of the first through sixth compositions, it is desirable to configure a lens component to be disposed on the object side in the first lens unit as a cemented lens component which is composed, in order from the object side, of a negative lens element and a positive lens element.

Figure 3:
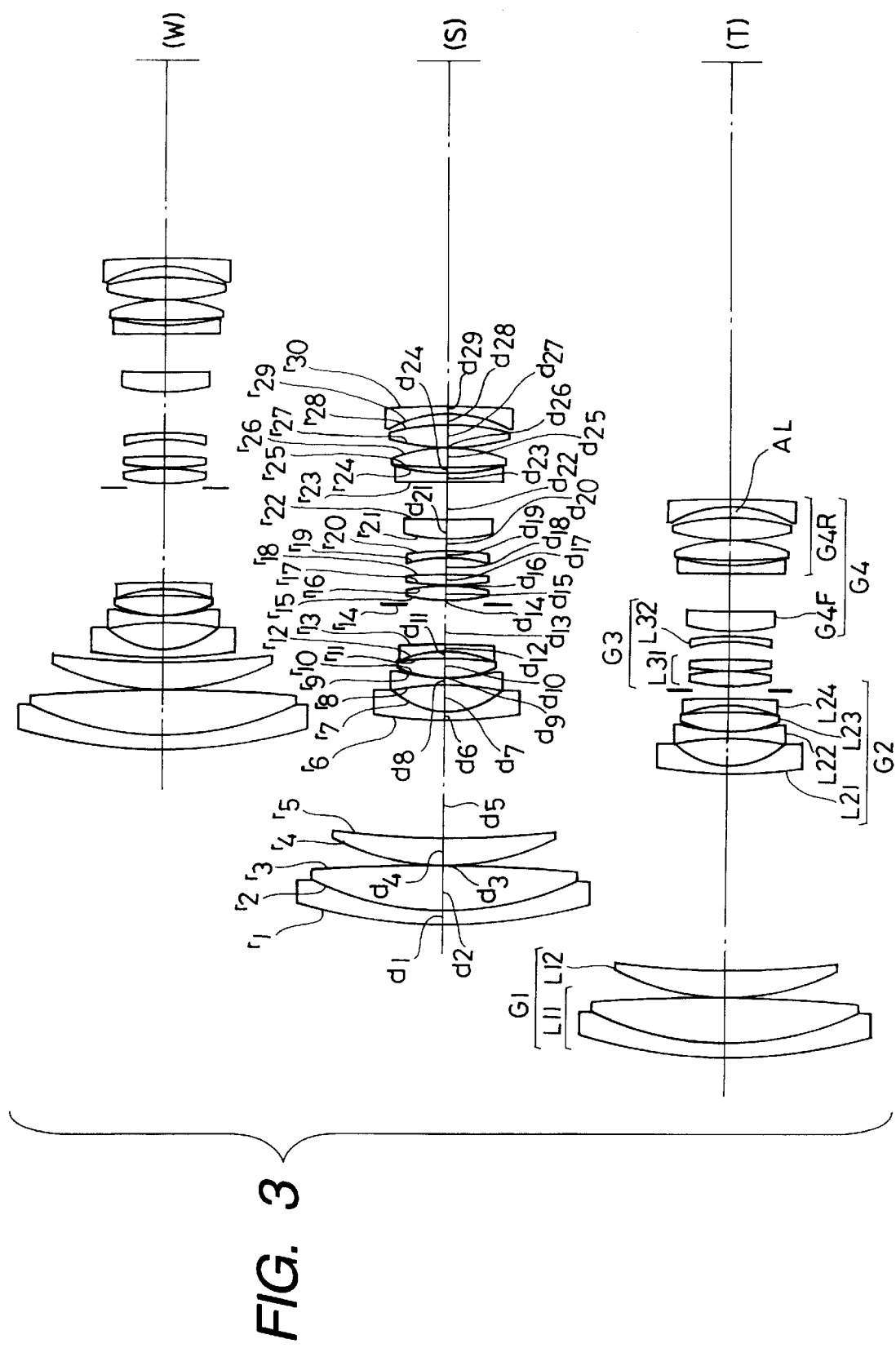
Figure 4:
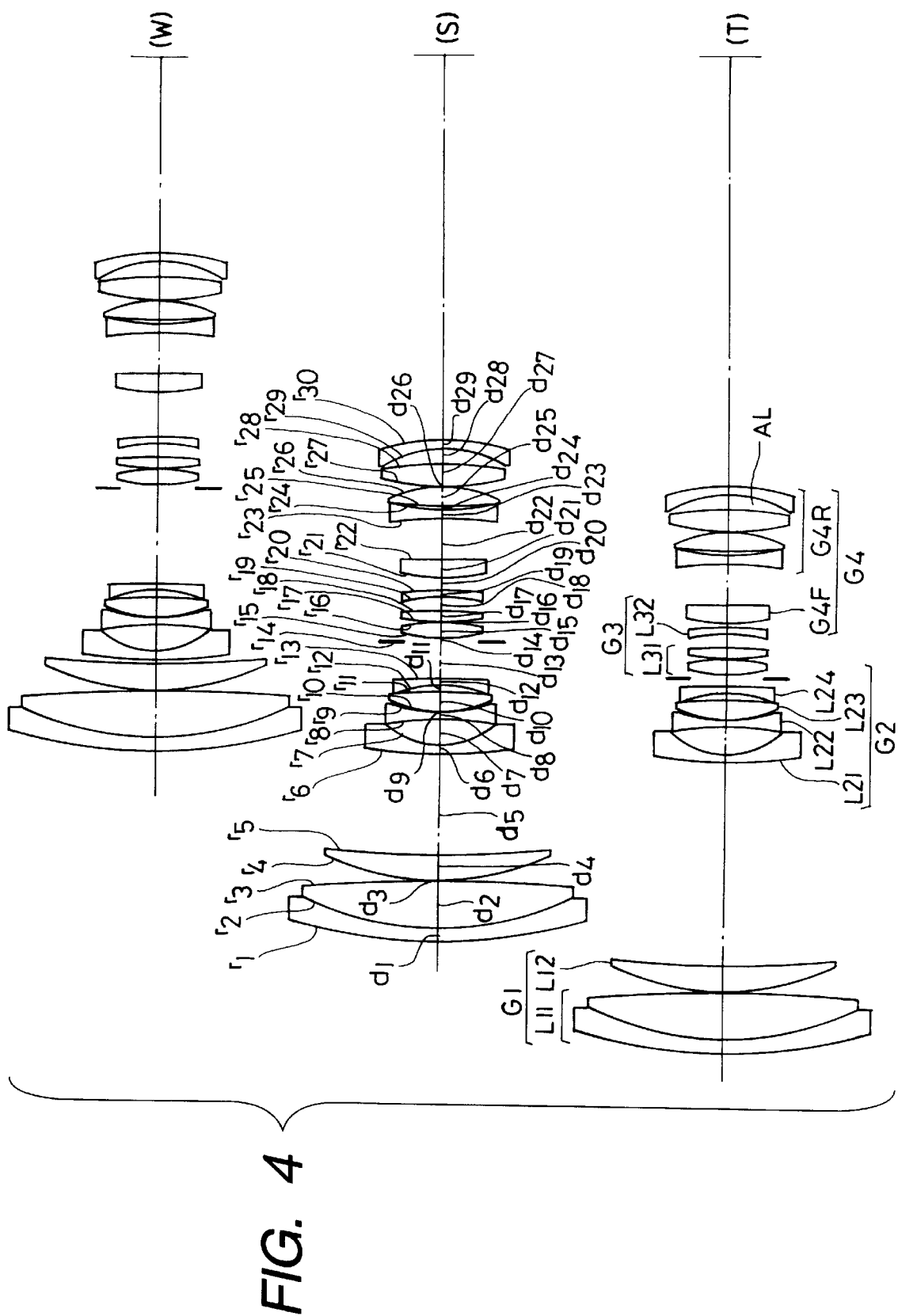
Figure 5:
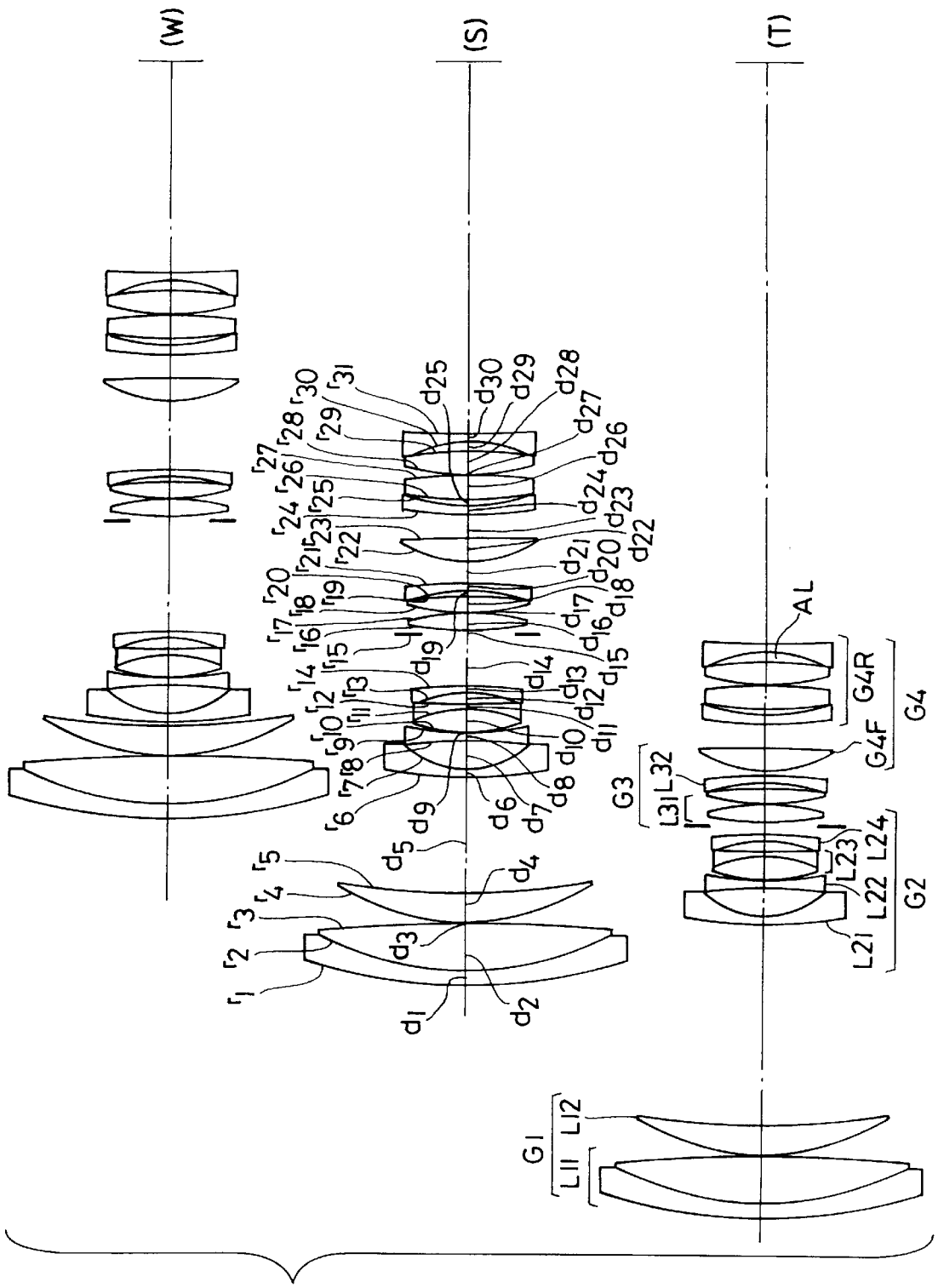

In the zoom lens system according to the present invention which has any one of the first through sixth compositions, a negative lens element LN and a positive lens element LP are disposed close to each other on the object side in the first lens unit to strengthen a function to correct lateral chromatic aberration. When a field angle is widened in this composition, a light bundle coming from a high location of an object is reflected by an image side surface R2 of the negative lens element LN disposed on the object side, further reflected by an object side surface R1 of the lens element and incident on the image surface as shown in FIG. 3, thereby producing ghost.

Figure 14:
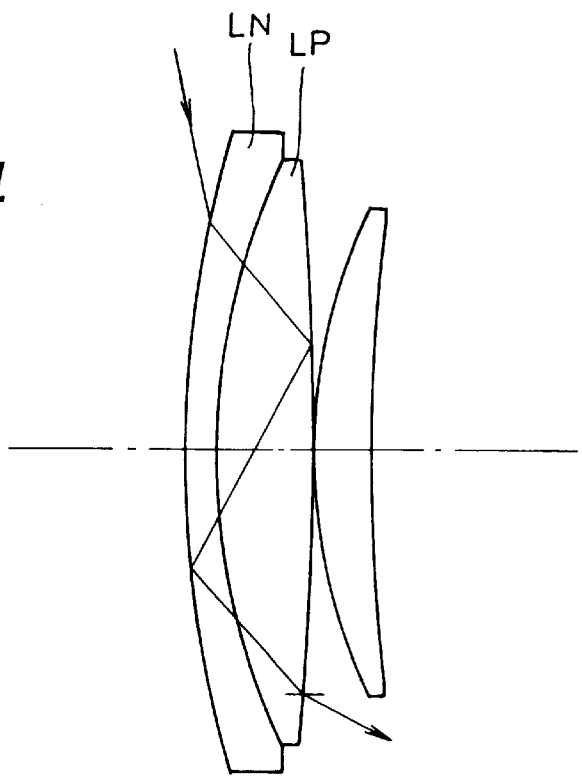

By configuring the negative lens element LN to the positive lens element LP as described above so as to compose a cemented lens component as described above, it is possible to reduce ghost as shown in FIG. 14.

For the zoom lens system according to the present invention which has the first or any one of the third through sixth compositions, it is desirable to satisfy the following condition (3-1):

(3-1) $0.045 < D_4/h < 0.6$

The condition (3-1) is required to suppress divergence of rays emerging from the front subunit of the fourth lens unit, thereby allowing the fourth lens unit to have a smaller diameter and obtaining optical performance of the zoom lens system which is more favorable over the entire vari-focal region.

If an upper limit of 0.6 of the condition (3-1) is exceeded, variations of offaxial aberrations such as distortion and coma over the entire vari-focal region can be suppressed, but the fourth lens unit will have a large diameter and a long total length, thereby making it impossible to configure the zoom lens system compact. If a lower limit of 0.045 of the condition (3-1) is exceeded, in contrast, it will be possible to correct spherical aberration favorably and reduce the diameter and total length of the fourth lens unit, but offaxial performance will be varied remarkably over the entire vari-focal region, thereby making it impossible to obtain favorable optical performance.

The condition (3-1) which is adopted in place of the condition (3) has a lower limit to lessen a burden on the fourth lens unit which is imposed to maintain the offaxial performance.

When the zoom lens system according to the present invention which has the first composition satisfies the condition (2), it is capable of correcting curvature of field and lessening the burden on the fourth lens unit which is imposed to correct offaxial aberrations.

When the zoom lens system according to the present invention which has the third composition satisfies the condition (4), it is capable of correcting offaxial aberrations of high orders, thereby lessening the burden on the fourth lens unit which is imposed to correct offaxial aberrations.

When the zoom lens system according to the present invention which has the fourth composition satisfies the condition (6) in particular, it is capable of favorably correcting chromatic aberration of high orders, thereby facilitating to correct aberrations, offaxial aberrations in particular and lessening the burden on the fourth lens unit which is imposed to maintain the offaxial performance.

Furthermore, a seventh composition of the zoom lens system according to the present invention is the fundamental composition described above wherein the first lens component disposed on the object side in the first lens unit is configured as a cemented lens component consisting, in order from the object side, of a negative lens element and a positive lens element and the zoom lens system satisfies the condition (3-1) mentioned above.

When the lens component disposed on the object side in the first lens unit is configured as a cemented lens component as described above to satisfy the condition (3-1) in place of the condition (3), the zoom lens system which has the seventh composition is capable of enhancing offaxial performance of the fourth lens unit.

The condition (3-1) has been adopted to suppress the divergence of the rays emerging from front subunit of the fourth lens unit, thereby reducing the diameter of the fourth lens unit and obtaining favorable performance over the entire vari-focal region.

If an upper limit of 0.6 of the condition (3-1) is exceeded, variations of offaxial aberrations such as distortion and coma can be suppressed over the entire vari-focal region, but the fourth lens unit will have a large diameter and a long total length, thereby making it impossible to configure the zoom lens system compact. If a lower limit of 0.045 of the condition (3-1) is exceeded, in contrast, spherical aberration can be corrected favorably and the fourth lens unit can have a small diameter and a short total length, but offaxial performance will be varied remarkably over the entire vari-focal region, thereby making it impossible to maintain favorable offaxial performance.

In the zoom lens system which has the seventh composition, a burden imposed on the fourth lens unit to correct offaxial aberrations is shared with the lens component which is disposed on the object side in the first lens unit as described above so that the offaxial aberrations can be corrected with the fourth lens unit even when the lower limit of the condition (3) has a small value. In other words, the lens component which is disposed on the object side in the first lens unit is configured as the cemented lens component consisting, in order from the object side, of the negative lens element and the positive lens element so that this lens component has a function to correct lateral chromatic aberration, thereby lessening a function of the fourth lens unit to correct chromatic aberration.

Accordingly, the zoom lens system according to the present invention which has the seventh composition satisfies the condition (3-1) in place of the condition (3), thereby being compact and having favorable optical performance.

Furthermore, it is more desirable to satisfy, in place of the conditions (2), (3) or (3-1), (4) and (5), he following conditions (2-1), (3-2), (4-1) and (5-1) respectively:

(2-1) $8 < h \times z/\Delta D_{34} < 23$ (3-2) $0.12 < D_4/h < 0.45$ (4-1) $0.6 < f_{4F}/f_4 < 1.5$ (5-1) $5.5 < f_{4F}/D_4 < 30$ To obtain effects for further enhancement of optical performance and the like, it is desirable to satisfy some of these conditions as a combination.

Now, description will be made of the preferred embodiments which have numerical data listed below:

Embodiment 1

$f = 28.988 \sim 79.965 \sim 174.050 (\text{mm})$,
F number $= 4.512 \sim 6.338 \sim 7.232$, $2\omega = 76.2° \sim 29.2° \sim 13.7°$,
$f_B = 37.172 \sim 66.778 \sim 80.294 (\text{mm})$

| | | | |
|---|---|---|---|
| $r_1 = 92.043$ | | | |
| | $d_1 = 2.800$ | $n_1 = 1.84666$ | $v_1 = 23.78$ |
| $r_2 = 57.525$ | | | |
| | $d_2 = 8.700$ | $n_2 = 1.48749$ | $v_2 = 70.23$ |
| $r_3 = -278.427$ | | | |
| | $d_3 = 0.200$ | | |
| $r_4 = 47.100$ | | | |
| | $d_4 = 4.850$ | $n_3 = 1.48749$ | $v_3 = 70.23$ |
| $r_5 = 165.603$ | | | |
| | $d_5 = D_1$ (variable) | | |
| $r_6 = 82.786$ | | | |
| | $d_6 = 1.650$ | $n_4 = 1.77250$ | $v_4 = 49.60$ |
| $r_7 = 15.333$ | | | |
| | $d_7 = 5.100$ | | |
| $r_8 = -46.341$ | | | |
| | $d_8 = 1.300$ | $n_5 = 1.77250$ | $v_5 = 49.60$ |
| $r_9 = 30.620$ | | | |
| | $d_9 = 0.200$ | | |
| $r_{10} = 25.147$ | | | |
| | $d_{10} = 3.750$ | $n_6 = 1.84666$ | $v_6 = 23.78$ |
| $r_{11} = -70.534$ | | | |
| | $d_{11} = 1.250$ | | |
| $r_{12} = -24.075$ | | | |
| | $d_{12} = 1.300$ | $n_7 = 1.77250$ | $v_7 = 49.60$ |
| $r_{13} = -113.233$ | | | |
| | $d_{13} = D_2$ (variable) | | |
| $r_{14} = \infty$ (stop) | | | |
| | $d_{14} = 0.650$ | | |
| $r_{15} = 30.726$ | | | |
| | $d_{15} = 2.800$ | $n_8 = 1.49700$ | $v_8 = 81.54$ |
| $r_{16} = -46.240$ | | | |
| | $d_{16} = 0.200$ | | |
| $r_{17} = 64.384$ | | | |
| | $d_{17} = 2.100$ | $n_9 = 1.48749$ | $v_9 = 70.23$ |
| $r_{18} = -91.938$ | | | |
| | $d_{18} = 2.571$ | | |
| $r_{19} = -27.279$ | | | |
| | $d_{19} = 1.250$ | $n_{10} = 1.84666$ | $v_{10} = 23.78$ |

-continued

Embodiment 1

$f = 28.988 \sim 79.965 \sim 174.050$ (mm),
F number = $4.512 \sim 6.338 \sim 7.232$, $2\omega = 76.2° \sim 29.2° \sim 13.7°$,
$f_B = 37.172 \sim 66.778 \sim 80.294$ (mm)

| | | | |
|---|---|---|---|
| $r_{20} = -53.038$ | | | |
| | $d_{20} = D_3$ (variable) | | |
| $r_{21} = 37.923$ | | | |
| | $d_{21} = 3.500$ | $n_{11} = 1.48749$ | $\nu_{11} = 70.23$ |
| $r_{22} = 370.001$ | | | |
| | $d_{22} = 8.316$ | | |
| $r_{23} = 545.893$ | | | |
| | $d_{23} = 1.650$ | $n_{12} = 1.73400$ | $\nu_{12} = 51.47$ |
| $r_{24} = 43.816$ | | | |
| | $d_{24} = 1.349$ | | |
| $r_{25} = 123.168$ | | | |
| | $d_{25} = 3.800$ | $n_{13} = 1.51633$ | $\nu_{13} = 64.14$ |
| $r_{26} = -42.648$ | | | |
| | $d_{26} = 0.150$ | | |
| $r_{27} = 60.117$ | | | |
| | $d_{27} = 4.300$ | $n_{14} = 1.53172$ | $\nu_{14} = 48.84$ |
| $r_{28} = -39.155$ | | | |
| | $d_{28} = 2.280$ | | |
| $r_{29} = -20.524$ | | | |
| | $d_{29} = 1.500$ | $n_{15} = 1.80440$ | $\nu_{15} = 39.59$ |
| $r_{30} = -49.110$ | | | |

| | | | |
|---|---|---|---|
| f | 28.988 | 79.965 | 174.050 |
| $D_1$ | 0.849 | 21.519 | 37.861 |
| $D_2$ | 18.757 | 7.597 | 0.993 |
| $D_3$ | 6.928 | 1.844 | 0.727 |

$|f_2|/f_1 = 0.177$, $h \times z/\Delta D_{34} = 20.92$, $D_4/h = 0.3852$
$f_{4F}/f_4 = 1.21749$, $f_{4F}/D_4 = 10.3822$

Embodiment 2

$f = 29.002 \sim 80.165 \sim 174.060$ (mm),
F number = $3.912 \sim 5.881 \sim 7.207$, $2\omega = 76.1° \sim 29.2° \sim 13.7°$,
$f_B = 37.191 \sim 66.088 \sim 85.109$ (mm)

| | | | |
|---|---|---|---|
| $r_1 = 117.587$ | | | |
| | $d_1 = 2.600$ | $n_1 = 1.84666$ | $\nu_1 = 23.78$ |
| $r_2 = 65.473$ | | | |
| | $d_2 = 8.250$ | $n_2 = 1.48719$ | $\nu_2 = 70.23$ |
| $r_3 = -194.182$ | | | |
| | $d_3 = 0.200$ | | |
| $r_4 = 42.496$ | | | |
| | $d_4 = 4.400$ | $n_3 = 1.48749$ | $\nu_3 = 70.23$ |
| $r_5 = 139.853$ | | | |
| | $d_5 = D_1$ (variable) | | |
| $r_6 = 97.585$ | | | |
| | $d_6 = 1.500$ | $n_4 = 1.77250$ | $\nu_4 = 49.60$ |
| $r_7 = 16.151$ | | | |
| | $d_7 = 5.406$ | | |
| $r_8 = -39.258$ | | | |
| | $d_8 = 1.300$ | $n_5 = 1.77250$ | $\nu_5 = 49.60$ |
| $r_9 = 59.968$ | | | |
| | $d_9 = 0.200$ | | |
| $r_{10} = 33.600$ | | | |
| | $d_{10} = 3.700$ | $n_6 = 1.84666$ | $\nu_6 = 23.78$ |
| $r_{11} = -56.981$ | | | |
| | $d_{11} = 1.200$ | | |
| $r_{12} = -27.687$ | | | |
| | $d_{12} = 1.300$ | $n_7 = 1.77250$ | $\nu_7 = 49.60$ |
| $r_{13} = -120.737$ | | | |
| | $d_{13} = D_2$ (variable) | | |
| $r_{14} = \infty$ (stop) | | | |
| | $d_{14} = 0.650$ | | |
| $r_{15} = 55.047$ | | | |
| | $d_{15} = 2.800$ | $n_8 = 1.49700$ | $\nu_8 = 81.54$ |
| $r_{16} = -64.602$ | | | |
| | $d_{16} = 0.200$ | | |

-continued

Embodiment 2

$f = 29.002 \sim 80.165 \sim 174.060$ (mm),
F number = $3.912 \sim 5.881 \sim 7.207$, $2\omega = 76.1° \sim 29.2° \sim 13.7°$,
$f_B = 37.191 \sim 66.088 \sim 85.109$ (mm)

| | | | |
|---|---|---|---|
| $r_{17} = 49.938$ | | | |
| | $d_{17} = 2.100$ | $n_9 = 1.56384$ | $\nu_9 = 60.67$ |
| $r_{18} = -376.120$ | | | |
| | $d_{18} = 1.607$ | | |
| $r_{19} = -38.597$ | | | |
| | $d_{19} = 1.250$ | $n_{10} = 1.84666$ | $\nu_{10} = 23.78$ |
| $r_{20} = -119.336$ | | | |
| | $d_{20} = D_3$ (variable) | | |
| $r_{21} = 32.812$ | | | |
| | $d_{21} = 4.169$ | $n_{11} = 1.48749$ | $\nu_{11} = 70.23$ |
| $r_{22} = -161.383$ | | | |
| | $d_{22} = 8.472$ | | |
| $r_{23} = 34.934$ | | | |
| | $d_{23} = 1.650$ | $n_{12} = 1.72916$ | $\nu_{12} = 54.68$ |
| $r_{24} = 23.810$ | | | |
| | $d_{24} = 2.045$ | | |
| $r_{25} = 66.580$ | | | |
| | $d_{25} = 3.700$ | $n_{13} = 1.51823$ | $\nu_{13} = 58.90$ |
| $r_{26} = -44.222$ | | | |
| | $d_{26} = 0.150$ | | |
| $r_{27} = 38.744$ | | | |
| | $d_{27} = 5.000$ | $n_{14} = 1.54814$ | $\nu_{14} = 45.79$ |
| $r_{28} = -45.770$ | | | |
| | $d_{28} = 0.969$ | | |
| $r_{29} = -26.660$ | | | |
| | $d_{29} = 1.500$ | $n_{15} = 1.80440$ | $\nu_{15} = 39.59$ |
| $r_{30} = 73.848$ | | | |

| | | | |
|---|---|---|---|
| f | 29.002 | 80.165 | 174.060 |
| $D_1$ | 0.940 | 18.165 | 33.198 |
| $D_2$ | 22.844 | 9.025 | 1.065 |
| $D_3$ | 7.303 | 1.711 | 0.462 |

$|f_2|/f_1 = 0.211$, $h \times z/\Delta D_{34} = 18.95$, $D_4/h = 0.3921$
$f_{4F}/f_4 = 1.11039$, $f_{4F}/D_4 = 6.65053$

Embodiment 3

$f = 28.955 \sim 79.908 \sim 174.018$ (mm),
F number = $4.341 \sim 6.071 \sim 7.236$, $2\omega = 76.5° \sim 29.2° \sim 13.7°$,
$f_B = 37.182 \sim 64.863 \sim 82.184$ (mm)

| | | | |
|---|---|---|---|
| $r_1 = 94.057$ | | | |
| | $d_1 = 2.800$ | $n_1 = 1.84666$ | $\nu_1 = 23.78$ |
| $r_2 = 58.098$ | | | |
| | $d_2 = 8.500$ | $n_2 = 1.48749$ | $\nu_2 = 70.23$ |
| $r_3 = -294.720$ | | | |
| | $d_3 = 0.100$ | | |
| $r_4 = 46.553$ | | | |
| | $d_4 = 5.150$ | $n_3 = 1.48749$ | $\nu_3 = 70.23$ |
| $r_5 = 167.690$ | | | |
| | $d_5 = D_1$ (variable) | | |
| $r_6 = 89.219$ | | | |
| | $d_6 = 1.650$ | $n_4 = 1.77250$ | $\nu_4 = 49.60$ |
| $r_7 = 15.159$ | | | |
| | $d_7 = 5.050$ | | |
| $r_8 = -47.990$ | | | |
| | $d_8 = 1.300$ | $n_5 = 1.77250$ | $\nu_5 = 49.60$ |
| $r_9 = 32.861$ | | | |
| | $d_9 = 0.100$ | | |
| $r_{10} = 25.281$ | | | |
| | $d_{10} = 3.700$ | $n_6 = 1.84666$ | $\nu_6 = 23.78$ |
| $r_{11} = -71.756$ | | | |
| | $d_{11} = 1.250$ | | |
| $r_{12} = -24.087$ | | | |
| | $d_{12} = 1.300$ | $n_7 = 1.77250$ | $\nu_7 = 49.60$ |
| $r_{13} = -135.220$ | | | |
| | $d_{13} = D_2$ (variable) | | |
| $r_{14} = \infty$ (stop) | | | |
| | $d_{14} = 0.650$ | | |

-continued

Embodiment 3

$f = 28.955\sim79.908\sim174.018$ (mm),
F number = $4.341\sim6.071\sim7.236$, $2\omega = 76.5°\sim29.2°\sim13.7°$,
$f_B = 37.182\sim64.863\sim82.184$ (mm)

| | | | |
|---|---|---|---|
| $r_{15} = 33.434$ | | | |
| | $d_{15} = 2.800$ | $n_8 = 1.49700$ | $\nu_8 = 81.54$ |
| $r_{16} = -43.022$ | | | |
| | $d_{16} = 0.120$ | | |
| $r_{17} = 55.838$ | | | |
| | $d_{17} = 2.100$ | $n_9 = 1.48749$ | $\nu_9 = 70.23$ |
| $r_{18} = -116.552$ | | | |
| | $d_{18} = 3.210$ | | |
| $r_{19} = -26.542$ | | | |
| | $d_{19} = 1.250$ | $n_{10} = 1.84666$ | $\nu_{10} = 23.78$ |
| $r_{20} = -50.224$ | | | |
| | $d_{20} = D_3$ (variable) | | |
| $r_{21} = 37.002$ | | | |
| | $d_{21} = 3.700$ | $n_{11} = 1.48749$ | $\nu_{11} = 70.23$ |
| $r_{22} = 322.727$ | | | |
| | $d_{22} = 7.151$ | | |
| $r_{23} = 613.899$ | | | |
| | $d_{23} = 1.650$ | $n_{12} = 1.74100$ | $\nu_{12} = 52.64$ |
| $r_{24} = 39.776$ | | | |
| | $d_{24} = 0.891$ | | |
| $r_{25} = 97.090$ | | | |
| | $d_{25} = 3.800$ | $n_{13} = 1.51633$ | $\nu_{13} = 64.14$ |
| $r_{26} = -30.282$ | | | |
| | $d_{26} = 0.150$ | | |
| $r_{27} = 43.894$ | | | |
| | $d_{27} = 4.300$ | $n_{14} = 1.53172$ | $\nu_{14} = 48.84$ |
| $r_{28} = -42.235$ | | | |
| | $d_{28} = 1.961$ | | |
| $r_{29} = -22.710$ | | | |
| | $d_{29} = 1.500$ | $n_{15} = 1.79952$ | $\nu_{15} = 42.22$ |
| $r_{30} = -151.448$ | | | |

| | | | |
|---|---|---|---|
| f | 28.955 | 79.908 | 174.018 |
| $D_1$ | 0.901 | 22.387 | 37.385 |
| $D_2$ | 18.241 | 7.694 | 1.300 |
| $D_3$ | 7.632 | 2.329 | 0.900 |

$|f_2|/f_1 = 0.174$, $h \times z/\Delta D_{34} = 19.29$, $D_4/h = 0.331$
$f_{4F}/f_4 = 1.27285$, $f_{4F}/D_4 = 11.9399$

Embodiment 4

$f = 28.958\sim80.051\sim173.982$ (mm),
F number = $4.459\sim6.599\sim7.187$, $2\omega = 76.6°\sim29.5°\sim13.7°$,
$f_B = 37.176\sim72.175\sim80.668$ (mm)

| | | | |
|---|---|---|---|
| $r_1 = 93.155$ | | | |
| | $d_1 = 2.800$ | $n_1 = 1.84666$ | $\nu_1 = 23.78$ |
| $r_2 = 57.825$ | | | |
| | $d_2 = 8.700$ | $n_2 = 1.48749$ | $\nu_2 = 70.23$ |
| $r_3 = -342.981$ | | | |
| | $d_3 = 0.200$ | | |
| $r_4 = 47.599$ | | | |
| | $d_4 = 4.850$ | $n_3 = 1.48749$ | $\nu_3 = 70.23$ |
| $r_5 = 184.187$ | | | |
| | $d_5 = D_1$ (variable) | | |
| $r_6 = 80.819$ | | | |
| | $d_6 = 1.650$ | $n_4 = 1.77250$ | $\nu_4 = 49.60$ |
| $r_7 = 15.682$ | | | |
| | $d_7 = 5.050$ | | |
| $r_8 = -56.407$ | | | |
| | $d_8 = 1.300$ | $n_5 = 1.77250$ | $\nu_5 = 49.60$ |
| $r_9 = 27.582$ | | | |
| | $d_9 = 0.200$ | | |
| $r_{10} = 23.611$ | | | |
| | $d_{10} = 3.750$ | $n_6 = 1.84666$ | $\nu_6 = 23.78$ |
| $r_{11} = -91.859$ | | | |
| | $d_{11} = 1.250$ | | |

-continued

Embodiment 4

$f = 28.958\sim80.051\sim173.982$ (mm),
F number = $4.459\sim6.599\sim7.187$, $2\omega = 76.6°\sim29.5°\sim13.7°$,
$f_B = 37.176\sim72.175\sim80.668$ (mm)

| | | | |
|---|---|---|---|
| $r_{12} = -24.112$ | | | |
| | $d_{12} = 1.300$ | $n_7 = 1.74100$ | $\nu_7 = 52.64$ |
| $r_{13} = -167.738$ | | | |
| | $d_{13} = D_2$ (variable) | | |
| $r_{14} = \infty$ (stop) | | | |
| | $d_{14} = 0.650$ | | |
| $r_{15} = 34.059$ | | | |
| | $d_{15} = 2.800$ | $n_8 = 1.49700$ | $\nu_8 = 81.54$ |
| $r_{16} = -39.784$ | | | |
| | $d_{16} = 0.200$ | | |
| $r_{17} = 51.563$ | | | |
| | $d_{17} = 2.100$ | $n_9 = 1.48749$ | $\nu_9 = 70.23$ |
| $r_{18} = -96.456$ | | | |
| | $d_{18} = 2.557$ | | |
| $r_{19} = -29.599$ | | | |
| | $d_{19} = 1.250$ | $n_{10} = 1.80518$ | $\nu_{10} = 25.42$ |
| $r_{20} = -81.881$ | | | |
| | $d_{20} = D_3$ (variable) | | |
| $r_{21} = 34.353$ | | | |
| | $d_{21} = 3.500$ | $n_{11} = 1.56384$ | $\nu_{11} = 60.67$ |
| $r_{22} = 283.363$ | | | |
| | $d_{22} = 7.777$ | | |
| $r_{23} = -64.167$ | | | |
| | $d_{23} = 1.650$ | $n_{12} = 1.72916$ | $\nu_{12} = 54.68$ |
| $r_{24} = 41.187$ | | | |
| | $d_{24} = 0.677$ | | |
| $r_{25} = 86.310$ | | | |
| | $d_{25} = 3.700$ | $n_{13} = 1.51633$ | $\nu_{13} = 64.14$ |
| $r_{26} = -25.043$ | | | |
| | $d_{26} = 0.150$ | | |
| $r_{27} = 46.002$ | | | |
| | $d_{27} = 4.200$ | $n_{14} = 1.51742$ | $\nu_{14} = 52.43$ |
| $r_{28} = -69.503$ | | | |
| | $d_{28} = 2.999$ | | |
| $r_{29} = -20.959$ | | | |
| | $d_{29} = 1.500$ | $n_{15} = 1.80440$ | $\nu_{15} = 39.59$ |
| $r_{30} = -40.119$ | | | |

| | | | |
|---|---|---|---|
| f | 28.958 | 80.051 | 173.982 |
| $D_1$ | 0.869 | 19.191 | 38.753 |
| $D_2$ | 18.240 | 7.042 | 1.200 |
| $D_3$ | 8.338 | 2.416 | 0.700 |

$|f_2|/f_1 = 0.171$, $h \times z/\Delta D_{34} = 17.38$, $D_4/h = 0.3593$
$f_{4F}/f_4 = 1.01655$, $f_{4F}/D_4 = 8.54381$

Embodiment 5

$f = 28.958\sim83.654\sim241.854$ (mm),
F number = $4.479\sim5.707\sim7.079$, $2\omega = 75.0°\sim28.1°\sim10.0°$,
$f_B = 37.770\sim66.612\sim104.453$ (mm)

| | | | |
|---|---|---|---|
| $r_1 = 97.202$ | | | |
| | $d_1 = 2.800$ | $n_1 = 1.84666$ | $\nu_1 = 23.78$ |
| $r_2 = 57.723$ | | | |
| | $d_2 = 8.500$ | $n_2 = 1.48749$ | $\nu_2 = 70.23$ |
| $r_3 = -279.696$ | | | |
| | $d_3 = 0.100$ | | |
| $r_4 = 41.447$ | | | |
| | $d_4 = 5.150$ | $n_3 = 1.48749$ | $\nu_3 = 70.23$ |
| $r_5 = 126.400$ | | | |
| | $d_5 = D_1$ (variable) | | |
| $r_6 = 74.683$ | | | |
| | $d_6 = 1.600$ | $n_4 = 1.77250$ | $\nu_4 = 49.60$ |
| $r_7 = 16.003$ | | | |
| | $d_7 = 5.100$ | | |
| $r_8 = -90.012$ | | | |
| | $d_8 = 1.300$ | $n_5 = 1.77250$ | $\nu_5 = 49.60$ |
| $r_9 = 46.922$ | | | |
| | $d_9 = 0.100$ | | |

-continued

Embodiment 5 f = 28.958~83.654~241.854(mm),
F number = 4.479~5.707~7.079, 2ω = 75.0°~28.1°~10.0°,
$f_B$ = 37.770~66.612~104.453(mm)

| | | | |
|---|---|---|---|
| $r_{10}$ = 28.241 | | | |
| | $d_{10}$ = 4.200 | $n_6$ = 1.80518 | $v_6$ = 25.42 |
| $r_{11}$ = −25.611 | | | |
| | $d_{11}$ = 1.000 | $n_7$ = 1.78800 | $v_7$ = 47.37 |
| $r_{12}$ = 263.756 | | | |
| | $d_{12}$ = 1.986 | | |
| $r_{13}$ = −24.969 | | | |
| | $d_{13}$ = 1.200 | $n_8$ = 1.81600 | $v_8$ = 46.62 |
| $r_{14}$ = −95.756 | | | |
| | $d_{14}$ = $D_2$ (variable) | | |
| $r_{15}$ = ∞ (stop) | | | |
| | $d_{15}$ = 0.650 | | |
| $r_{16}$ = 59.475 | | | |
| | $d_{16}$ = 3.100 | $n_9$ = 1.49700 | $v_9$ = 81.54 |
| $r_{17}$ = −44.257 | | | |
| | $d_{17}$ = 0.120 | | |
| $r_{18}$ = 41.278 | | | |
| | $d_{18}$ = 2.800 | $n_{10}$ = 1.48749 | $v_{10}$ = 70.23 |
| $r_{19}$ = −120.388 | | | |
| | $d_{19}$ = 1.034 | | |
| $r_{20}$ = −37.111 | | | |
| | $d_{20}$ = 1.250 | $n_{11}$ = 1.74666 | $v_{11}$ = 23.78 |
| $r_{21}$ = −109.815 | | | |
| | $d_{21}$ = $D_3$ (variable) | | |
| $r_{22}$ = 24.602 (aspherical surface) | | | |
| | $d_{22}$ = 4.000 | $n_{12}$ = 1.48749 | $v_{12}$ = 70.23 |
| $r_{23}$ = −293.704 | | | |
| | $d_{23}$ = 4.356 | | |
| $r_{24}$ = 77.929 | | | |
| | $d_{24}$ = 1.650 | $n_{13}$ = 1.74320 | $v_{13}$ = 49.34 |
| $r_{25}$ = 32.839 | | | |
| | $d_{25}$ = 1.151 | | |
| $r_{26}$ = 59.922 | | | |
| | $d_{26}$ = 4.200 | $n_{14}$ = 1.52249 | $v_{14}$ = 59.84 |
| $r_{27}$ = −97.299 | | | |
| | $d_{27}$ = 0.150 | | |
| $r_{28}$ = 41.175 | | | |
| | $d_{28}$ = 4.300 | $n_{15}$ = 1.53172 | $v_{15}$ = 48.74 |
| $r_{29}$ = −72.730 | | | |
| | $d_{29}$ = 1.577 | | |
| $r_{30}$ = −28.826 (aspherical surface) | | | |
| | $d_{30}$ = 1.500 | $n_{16}$ = 1.81600 | $v_{16}$ = 46.62 |
| $r_{31}$ = 208.761 | | | | aspherical surface coefficients (22nd surface) k = 0, $A_4$ = 4.6153 × 10$^{-6}$, $A_6$ = 1.3769 × 10$^{-8}$
$A_8$ = 7.7541 × 10$^{-13}$, $A_{10}$ = 1.1702 × 10$^{-13}$
(30th surface) k = 0, $A_4$ = −2.0263 × 10$^{-5}$, $A_6$ = −4.3287 × 10$^{-8}$
$A_8$ = 1.0137 × 10$^{-11}$, $A_{10}$ = −9.6379 × 10$^{-13}$

| f | 28.958 | 83.654 | 241.854 |
|---|---|---|---|
| $D_1$ | 0.901 | 20.990 | 36.428 |
| $D_2$ | 20.216 | 9.476 | 1.300 |
| $D_3$ | 12.266 | 4.219 | 0.900 |

$|f_2|/f_1$ = 0.176, h × z/$\Delta D_{34}$ = 15.87, $D_4$/h = 0.2019
$f_{4F}/f_4$ = 0.79836, $f_{4F}/D_4$ = 10.7248

Embodiment 6 f = 28.959~83.659~241.776(mm),
F number = 4.479~5.710~7.093, 2ω = 75.0°~28.1°~10.0°,
$f_B$ = 37.779~66.629~104.661(mm)

| | | | |
|---|---|---|---|
| $r_1$ = 95.886 | | | |
| | $d_1$ = 2.800 | $n_1$ = 1.84666 | $v_1$ = 23.78 |
| $r_2$ = 57.114 | | | |
| | $d_2$ = 8.500 | $n_2$ = 1.48749 | $v_2$ = 70.23 |
| $r_3$ = −282.556 | | | |
| | $d_3$ = 0.100 | | |
| $r_4$ = 41.197 | | | |
| | $d_4$ = 5.150 | $n_3$ = 1.48749 | $v_3$ = 70.23 |
| $r_5$ = 122.275 | | | |
| | $d_5$ = $D_1$ (variable) | | |
| $r_6$ = 76.472 | | | |
| | $d_6$ = 1.600 | $n_4$ = 1.77250 | $v_4$ = 49.60 |
| $r_7$ = 15.849 (aspherical surface) | | | |
| | $d_7$ = 5.100 | | |
| $r_8$ = −97.348 | | | |
| | $d_8$ = 1.300 | $n_5$ = 1.77250 | $v_5$ = 49.60 |
| $r_9$ = 45.089 | | | |
| | $d_9$ = 0.100 | | |
| $r_{10}$ = 27.730 | | | |
| | $d_{10}$ = 4.200 | $n_6$ = 1.80518 | $v_6$ = 25.42 |
| $r_{11}$ = −26.009 | | | |
| | $d_{11}$ = 1.000 | $n_7$ = 1.78800 | $v_7$ = 47.37 |
| $r_{12}$ = 492.130 | | | |
| | $d_{12}$ = 1.964 | | |
| $r_{13}$ = −24.105 | | | |
| | $d_{13}$ = 1.200 | $n_8$ = 1.81600 | $v_8$ = 46.62 |
| $r_{14}$ = −96.507 | | | |
| | $d_{14}$ = $D_2$ (variable) | | |
| $r_{15}$ = ∞ (stop) | | | |
| | $d_{15}$ = 0.650 | | |
| $r_{16}$ = 64.916 | | | |
| | $d_{16}$ = 3.100 | $n_9$ = 1.49700 | $v_9$ = 81.54 |
| $r_{17}$ = 42.644 | | | |
| | $d_{17}$ = 0.120 | | |
| $r_{18}$ = 41.430 | | | |
| | $d_{18}$ = 2.800 | $n_{10}$ = 1.48749 | $v_{10}$ = 70.23 |
| $r_{19}$ = −108.176 | | | |
| | $d_{19}$ = 0.998 | | |
| $r_{20}$ = −36.866 | | | |
| | $d_{20}$ = 1.250 | $n_{11}$ = 1.84666 | $v_{11}$ = 23.78 |
| $r_{21}$ = −108.275 | | | |
| | $d_{21}$ = $D_3$ (variable) | | |
| $r_{22}$ = 24.609 (aspherical surface) | | | |
| | $d_{22}$ = 4.000 | $n_{12}$ = 1.48749 | $v_{12}$ = 70.23 |
| $r_{23}$ = −311.343 | | | |
| | $d_{23}$ = 4.365 | | |
| $r_{24}$ = 77.869 | | | |
| | $d_{24}$ = 1.650 | $n_{13}$ = 1.74320 | $v_{13}$ = 49.34 |
| $r_{25}$ = 32.885 | | | |
| | $d_{25}$ = 1.142 | | |
| $r_{26}$ = 59.513 | | | |
| | $d_{26}$ = 4.200 | $n_{14}$ = 1.52249 | $v_{14}$ = 59.84 |
| $r_{27}$ = −100.728 | | | |
| | $d_{27}$ = 0.150 | | |
| $r_{28}$ = 41.688 | | | |
| | $d_{28}$ = 4.300 | $n_{15}$ = 1.53172 | $v_{15}$ = 48.84 |
| $r_{29}$ = −69.997 | | | |
| | $d_{29}$ = 1.581 | | |
| $r_{30}$ = −28.860 (aspherical surface) | | | |
| | $d_{30}$ = 1.500 | $n_{16}$ = 1.81600 | $v_{16}$ = 46.62 |
| $r_{31}$ = 203.327 | | | | aspherical surface coefficients (7th surface) k = 0, $A_4$ = −1.3922 × 10$^{-6}$, $A_6$ = 4.1434 × 10$^{-9}$
$A_8$ = −4.2437 × 10$^{-10}$, $A_{10}$ = 5.6556 × 10$^{-12}$
$A_{12}$ = −2.9269 × 10$^{-14}$
(22nd surface) k = 0, $A_4$ = 5.2080 × 10$^{-6}$, $A_6$ = 9.8832 × 10$^{-9}$
$A_8$ = 4.5549 × 10$^{-11}$, $A_{10}$ = −7.6302 × 10$^{-14}$
(30th surface) k = 0, $A_4$ = −2.0530 × 10$^{-5}$, $A_6$ = −4.2126 × 10$^{-8}$
$A_8$ = −1.3722 × 10$^{-11}$, $A_{10}$ = −8.1119 × 10$^{-13}$

| f | 28.959 | 83.659 | 241.776 |
|---|---|---|---|
| $D_1$ | 0.901 | 21.012 | 36.439 |
| $D_2$ | 20.207 | 9.471 | 1.300 |

-continued

Embodiment 6 f = 28.959~83.659~241.776(mm),
F number = 4.479~5.710~7.093, 2ω = 75.0°~28.1°~10.0°,
$f_B$ = 37.779~66.629~104.661(mm)

| | | | |
|---|---|---|---|
| $D_3$ | 12.238 | 4.110 | 0.900 |

$|f_2|/f_1$ = 0.176, h × z/ΔD$_{34}$ = 15.90, $D_4/h$ = 0.2023
$f_{4F}/f_4$ = 0.79502, $f_{4F}/D_4$ = 10.7483

Embodiment 7 f = 28.970~90.603~290.485(mm),
F number = 4.851~6.376~7.296, 2ω = 76.4°~26.3°~8.4°,
$f_B$ = 38.407~76.463~128.472(mm)

| | | | |
|---|---|---|---|
| $r_1$ = 91.595 | | | |
| | $d_1$ = 2.800 | $n_1$ = 1.84666 | $\nu_1$ = 23.78 |
| $r_2$ = 57.690 | | | |
| | $d_2$ = 7.682 | $n_2$ = 1.48749 | $\nu_2$ = 70.23 |
| $r_3$ = −580.651 | | | |
| | $d_3$ = 0.100 | | |
| $r_4$ = 43.579 | | | |
| | $d_4$ = 6.000 | $n_3$ = 1.48749 | $\nu_3$ = 70.23 |
| $r_5$ = 160.596 | | | |
| | $d_5$ = $D_1$ (variable) | | |
| $r_6$ = 424.713 | | | |
| | $d_6$ = 1.650 | $n_4$ = 1.81600 | $\nu_4$ = 46.62 |
| $r_7$ = 17.026 | | | |
| | $d_7$ = 5.050 | | |
| $r_8$ = −50.556 | | | |
| | $d_8$ = 1.300 | $n_5$ = 1.77250 | $\nu_5$ = 49.60 |
| $r_9$ = 87.065 (aspherical surface) | | | |
| | $d_9$ = 0.100 | | |
| $r_{10}$ = 38.226 | | | |
| | $d_{10}$ = 3.700 | $n_6$ = 1.84666 | $\nu_6$ = 23.78 |
| $r_{11}$ = −41.611 | | | |
| | $d_{11}$ = 1.250 | | |
| $r_{12}$ = −28.094 | | | |
| | $d_{12}$ = 1.289 | $n_7$ = 1.74100 | $\nu_7$ = 52.64 |
| $r_{13}$ = 127.887 | | | |
| | $d_{13}$ = $D_2$ (variable) | | |
| $r_{14}$ = ∞ (stop) | | | |
| | $d_{14}$ = 0.650 | | |
| $r_{15}$ = 41.599 | | | |
| | $d_{15}$ = 4.000 | $n_8$ = 1.49700 | $\nu_8$ = 81.54 |
| $r_{16}$ = −50.428 | | | |
| | $d_{16}$ = 0.120 | | |
| $r_{17}$ = 47.764 | | | |
| | $d_{17}$ = 3.800 | $n_9$ = 1.48749 | $\nu_9$ = 70.23 |
| $r_{18}$ = −279.212 | | | |
| | $d_{18}$ = 2.212 | | |
| $r_{19}$ = −40.224 | | | |
| | $d_{19}$ = 1.250 | $n_{10}$ = 1.84666 | $\nu_{10}$ = 23.78 |
| $r_{20}$ = −135.100 | | | |
| | $d_{20}$ = $D_3$ (variable) | | |
| $r_{21}$ = 39.860 | | | |
| | $d_{21}$ = 4.700 | $n_{11}$ = 1.49700 | $\nu_{11}$ = 81.54 |
| $r_{22}$ = −201.712 | | | |
| | $d_{22}$ = 3.277 | | |
| $r_{23}$ = 195.178 | | | |
| | $d_{23}$ = 1.650 | $n_{12}$ = 1.77250 | $\nu_{12}$ = 49.60 |
| $r_{24}$ = 58.552 | | | |
| | $d_{24}$ = 1.000 | | |
| $r_{25}$ = 59.822 | | | |
| | $d_{25}$ = 3.700 | $n_{13}$ = 1.51823 | $\nu_{13}$ = 58.90 |
| $r_{26}$ = −664.625 | | | |
| | $d_{26}$ = 0.150 | | |
| $r_{27}$ = 39.594 | | | |
| | $d_{27}$ = 4.400 | $n_{14}$ = 1.54814 | $\nu_{14}$ = 45.79 |

-continued

Embodiment 7 f = 28.970~90.603~290.485(mm),
F number = 4.851~6.376~7.296, 2ω = 76.4°~26.3°~8.4°,
$f_B$ = 38.407~76.463~128.472(mm)

| | | | |
|---|---|---|---|
| $r_{28}$ = −184.220 | | | |
| | $d_{28}$ = 4.288 | | |
| $r_{29}$ = −119.534 (aspherical surface) | | | |
| | $d_{29}$ = 1.500 | $n_{15}$ = 1.83481 | $\nu_{15}$ = 42.72 |
| $r_{30}$ = 55.043 | | | | aspherical surface coefficients (9th surface) k = 0, $A_4$ = −5.8932 × 10$^{-6}$, $A_6$ = −2.4765 × 10$^{-8}$,
$A_8$ = 1.5369 × 10$^{-10}$, $A_{10}$ = −1.4483 × 10$^{-12}$
(29th surface) k = 0, $A_4$ = −1.3795 × 10$^{-5}$, $A_6$ = −1.8049 × 10$^{-8}$,
$A_8$ = 1.2860 × 10$^{-10}$, $A_{10}$ = −4.9007 × 10$^{-13}$

| | | | |
|---|---|---|---|
| f | 28.970 | 90.603 | 290.485 |
| $D_1$ | 0.901 | 21.302 | 37.559 |
| $D_2$ | 24.865 | 10.746 | 1.300 |
| $D_3$ | 19.384 | 8.043 | 0.900 |

$|f_2|/f_1$ = 0.184, h × z/ΔD$_{34}$ = 11.77, $D_4/h$ = 0.144
$f_{4F}/f_4$ = 1.01754, $f_{4F}/D_4$ = 21.8296

Embodiment 8 f = 28.934~90.641~290.539(mm),
F number = 4.915~6.491~7.697, 2ω = 76.5°~26.2°~8.4°,
$f_B$ = 38.352~76.499~135.609(mm)

| | | | |
|---|---|---|---|
| $r_1$ = 102.855 | | | |
| | $d_1$ = 2.800 | $n_1$ = 1.84666 | $\nu_1$ = 23.78 |
| $r_2$ = 61.389 | | | |
| | $d_2$ = 7.601 | $n_2$ = 1.48749 | $\nu_2$ = 70.23 |
| $r_3$ = −343.177 | | | |
| | $d_3$ = 0.100 | | |
| $r_4$ = 42.398 | | | |
| | $d_4$ = 5.500 | $n_3$ = 1.48749 | $\nu_3$ = 70.23 |
| $r_5$ = 155.813 | | | |
| | $d_5$ = $D_1$ (variable) | | |
| $r_6$ = 116.199 | | | |
| | $d_6$ = 1.600 | $n_4$ = 1.77250 | $\nu_4$ = 49.60 |
| $r_7$ = 15.765 | | | |
| | $d_7$ = 5.200 | | |
| $r_8$ = −48.535 | | | |
| | $d_8$ = 1.300 | $n_5$ = 1.77250 | $\nu_5$ = 49.60 |
| $r_9$ = 82.033 | | | |
| | $d_9$ = 0.100 | | |
| $r_{10}$ = 32.739 | | | |
| | $d_{10}$ = 4.650 | $n_6$ = 1.80518 | $\nu_6$ = 25.42 |
| $r_{11}$ = −27.082 | | | |
| | $d_{11}$ = 1.000 | $n_7$ = 1.78800 | $\nu_7$ = 47.37 |
| $r_{12}$ = −327.840 | | | |
| | $d_{12}$ = 2.008 | | |
| $r_{13}$ = −28.723 | | | |
| | $d_{13}$ = 1.200 | $n_8$ = 1.80400 | $\nu_8$ = 46.57 |
| $r_{14}$ = −130.482 | | | |
| | $d_{14}$ = $D_2$ (variable) | | |
| $r_{15}$ = ∞ (stop) | | | |
| | $d_{15}$ = 0.650 | | |
| $r_{16}$ = 60.650 | | | |
| | $d_{16}$ = 4.000 | $n_9$ = 1.49700 | $\nu_9$ = 81.54 |
| $r_{17}$ = −42.679 | | | |
| | $d_{17}$ = 0.120 | | |
| $r_{18}$ = 35.029 | | | |
| | $d_{18}$ = 3.800 | $n_{10}$ = 1.48749 | $\nu_{10}$ = 70.23 |
| $r_{19}$ = −161.903 | | | |
| | $d_{19}$ = 1.756 | | |
| $r_{20}$ = −46.456 | | | |
| | $d_{20}$ = 1.250 | $n_{11}$ = 1.84666 | $\nu_{11}$ = 23.78 |
| $r_{21}$ = −194.714 | | | |
| | $d_{21}$ = $D_3$ (variable) | | |
| $r_{22}$ = 28.352 (aspherical surface) | | | |

-continued

Embodiment 8 f = 28.934~90.641~290.539(mm),
F number = 4.915~6.491~7.697, 2ω = 76.5°~26.2°~8.4°,
$f_B$ = 38.352~76.499~135.609(mm)

| | | | |
|---|---|---|---|
| | $d_{22}$ = 4.700 | $n_{12}$ = 1.49700 | $v_{12}$ = 81.54 |
| $r_{23}$ = 93.251 | | | |
| | $d_{23}$ = 3.275 | | |
| $r_{24}$ = 164.247 | | | |
| | $d_{24}$ = 1.650 | $n_{13}$ = 1.77250 | $v_{13}$ = 49.60 |
| $r_{25}$ = 55.758 | | | |
| | $d_{25}$ = 1.000 | | |
| $r_{26}$ = 35.584 | | | |
| | $d_{26}$ = 3.700 | $n_{14}$ = 1.51823 | $v_{14}$ = 58.90 |
| $r_{27}$ = 86.289 | | | |
| | $d_{27}$ = 0.150 | | |
| $r_{28}$ = 34.730 | | | |
| | $d_{28}$ = 4.400 | $n_{15}$ = 1.54814 | $v_{15}$ = 45.79 |
| $r_{29}$ = −262.650 | | | |
| | $d_{29}$ = 2.411 | | |
| $r_{30}$ = −49.144 (aspherical surface) | | | |
| | $d_{30}$ = 1.500 | $n_{16}$ = 1.83481 | $v_{16}$ = 42.72 |
| $r_{31}$ = 161.383 | | | | aspherical surface coefficients (22nd surface) k = 0, $A_4$ = 6.8864 × 10$^{-6}$, $A_6$ = 3.3614 × 10$^{-8}$
$A_8$ = −3.8567 × 10$^{-11}$, $A_{10}$ = 2.7544 × 10$^{-13}$
(30th surface) k = 0, $A_4$ = −2.6563 × 10$^{-5}$, $A_6$ = −5.0446 × 10$^{-8}$
$A_8$ = 1.5473 × 10$^{-10}$, $A_{10}$ = −1.0337 × 10$^{-12}$

| | | | |
|---|---|---|---|
| f | 28.934 | 90.641 | 290.539 |
| $D_1$ | 0.901 | 21.925 | 37.122 |
| $D_2$ | 22.456 | 10.009 | 1.300 |
| $D_3$ | 15.382 | 4.914 | 0.900 |

$|f_2|/f_1$ = 0.175, h × z/Δ$D_{34}$ = 15.42, $D_4$/h = 0.1468
$f_{4F}/f_4$ = 0.92924, $f_{4F}/D_4$ = 25.2271

Embodiment 9 f = 28.976~90.643~290.487(mm),
F number = 4.819~6.461~7.653, 2ω = 76.6°~26.1°~8.4°,
$f_B$ = 37.718~77.373~134.881(mm)

| | | | |
|---|---|---|---|
| $r_1$ = 107.580 | | | |
| | $d_1$ = 2.800 | $n_1$ = 1.84666 | $v_1$ = 23.78 |
| $r_2$ = 62.629 | | | |
| | $d_2$ = 8.300 | $n_2$ = 1.48749 | $v_2$ = 70.23 |
| $r_3$ = −267.255 | | | |
| | $d_3$ = 0.100 | | |
| $r_4$ = 46.820 | | | |
| | $d_4$ = 6.000 | $n_3$ = 1.48749 | $v_3$ = 70.23 |
| $r_5$ = 168.753 | | | |
| | $d_5$ = $D_1$ (variable) | | |
| $r_6$ = 230.923 | | | |
| | $d_6$ = 1.600 | $n_4$ = 1.77250 | $v_4$ = 49.60 |
| $r_7$ = 17.931 | | | |
| | $d_7$ = 5.100 | | |
| $r_8$ = −49.633 | | | |
| | $d_8$ = 1.300 | $n_5$ = 1.77250 | $v_5$ = 49.60 |
| $r_9$ = 45.863 | | | |
| | $d_9$ = 0.100 | | |
| $r_{10}$ = 32.904 | | | |
| | $d_{10}$ = 4.650 | $n_6$ = 1.80518 | $v_6$ = 25.42 |
| $r_{11}$ = −23.973 | | | |
| | $d_{11}$ = 1.000 | $n_7$ = 1.78800 | $v_7$ = 47.37 |
| $r_{12}$ = −83.060 | | | |
| | $d_{12}$ = 1.084 | | |
| $r_{13}$ = −33.713 | | | |
| | $d_{13}$ = 1.200 | $n_8$ = 1.80400 | $v_8$ = 46.57 |
| $r_{14}$ = −515.583 | | | |
| | $d_{14}$ = $D_2$ (variable) | | |

-continued

Embodiment 9 f = 28.976~90.643~290.487(mm),
F number = 4.819~6.461~7.653, 2ω = 76.6°~26.1°~8.4°,
$f_B$ = 37.718~77.373~134.881(mm)

| | | | |
|---|---|---|---|
| $r_{15}$ = ∞ (stop) | | | |
| | $d_{15}$ = 0.650 | | |
| $r_{16}$ = 54.213 | | | |
| | $d_{16}$ = 4.000 | $n_9$ = 1.49700 | $v_9$ = 81.54 |
| $r_{17}$ = −45.737 | | | |
| | $d_{17}$ = 0.120 | | |
| $r_{18}$ = 43.365 | | | |
| | $d_{18}$ = 3.800 | $n_{10}$ = 1.48749 | $v_{10}$ = 70.23 |
| $r_{19}$ = −123.017 | | | |
| | $d_{19}$ = 1.774 | | |
| $r_{20}$ = −42.636 | | | |
| | $d_{20}$ = 1.250 | $n_{11}$ = 1.84666 | $v_{11}$ = 23.78 |
| $r_{21}$ = −211.183 | | | |
| | $d_{21}$ = $D_3$ (variable) | | |
| $r_{22}$ = 41.353 | | | |
| | $d_{22}$ = 4.700 | $n_{12}$ = 1.49700 | $v_{12}$ = 81.54 |
| $r_{23}$ = −161.067 | | | |
| | $d_{23}$ = 5.159 | | |
| $r_{24}$ = 323.865 | | | |
| | $d_{24}$ = 1.650 | $n_{13}$ = 1.77250 | $v_{13}$ = 49.60 |
| $r_{25}$ = 67.167 | | | |
| | $d_{25}$ = 1.000 | | |
| $r_{26}$ = 79.385 | | | |
| | $d_{26}$ = 3.700 | $n_{14}$ = 1.51823 | $v_{14}$ = 58.90 |
| $r_{27}$ = −231.468 | | | |
| | $d_{27}$ = 0.150 | | |
| $r_{28}$ = 43.639 | | | |
| | $d_{28}$ = 4.400 | $n_{15}$ = 1.54814 | $v_{15}$ = 45.79 |
| $r_{29}$ = −112.898 | | | |
| | $d_{29}$ = 5.036 | | |
| $r_{30}$ = −81.165 (aspherical surface) | | | |
| | $d_{30}$ = 1.500 | $n_{16}$ = 1.83481 | $v_{16}$ = 42.72 |
| $r_{31}$ = 70.311 | | | | aspherical surface coefficients (30th surface) k = 0, $A_4$ = −1.2826 × 10$^{-5}$, $A_6$ = −4.6618 × 10$^{-9}$
$A_8$ = −3.3351 × 10$^{-11}$, $A_{10}$ = 1.1244 × 10$^{-13}$

| | | | |
|---|---|---|---|
| f | 28.976 | 90.643 | 290.487 |
| $D_1$ | 0.901 | 22.162 | 39.201 |
| $D_2$ | 22.641 | 9.620 | 1.300 |
| $D_3$ | 20.363 | 7.568 | 0.900 |

$|f_2|/f_1$ = 0.173, h × z/Δ$D_{34}$ = 10.75, $D_4$/h = 0.2093
$f_{4F}/f_4$ = 1.03704, $f_{4F}/D_4$ = 14.9889

Embodiment 10 f = 28.978~90.761~290.521(mm),
F number = 4.757~6.281~7.312, 2ω = 73.1°~25.9°~8.4°,
$f_B$ = 37.188~75.798~129.896(mm)

| | | | |
|---|---|---|---|
| $r_1$ = 101.108 | | | |
| | $d_1$ = 2.800 | $n_1$ = 1.84666 | $v_1$ = 23.78 |
| $r_2$ = 59.095 | | | |
| | $d_2$ = 10.203 | $n_2$ = 1.48749 | $v_2$ = 70.23 |
| $r_3$ = −295.896 | | | |
| | $d_3$ = 0.100 | | |
| $r_4$ = 45.255 | | | |
| | $d_4$ = 6.000 | $n_3$ = 1.48749 | $v_3$ = 70.23 |
| $r_5$ = 174.598 | | | |
| | $d_5$ = $D_1$ (variable) | | |
| $r_6$ = 110.881 | | | |
| | $d_6$ = 1.600 | $n_4$ = 1.77250 | $v_4$ = 49.60 |
| $r_7$ = 17.935 | | | |
| | $d_7$ = 5.100 | | |
| $r_8$ = −102.031 | | | |
| | $d_8$ = 1.300 | $n_5$ = 1.77250 | $v_5$ = 49.60 |
| $r_9$ = 36.190 | | | |

-continued

Embodiment 10 f = 28.978~90.761~290.521(mm),
F number = 4.757~6.281~7.312, 2ω = 73.1°~25.9°~8.4°,
$f_B$ = 37.188~75.798~129.896(mm)

| | | | |
|---|---|---|---|
| | $d_9$ = 0.100 | | |
| $r_{10}$ = 28.555 | | | |
| | $d_{10}$ = 4.650 | $n_6$ = 1.80518 | $v_6$ = 25.42 |
| $r_{11}$ = −26.446 | | | |
| | $d_{11}$ = 1.000 | $n_7$ = 1.78800 | $v_7$ = 47.37 |
| $r_{12}$ = −630.163 | | | |
| | $d_{12}$ = 1.732 | | |
| $r_{13}$ = −31.197 | | | |
| | $d_{13}$ = 1.200 | $n_8$ = 1.80400 | $v_8$ = 46.57 |
| $r_{14}$ = −270.431 | | | |
| | $d_{14}$ = $D_2$ (variable) | | |
| $r_{15}$ = ∞ (stop) | | | |
| | $d_{15}$ = 0.650 | | |
| $r_{16}$ = 53.477 | | | |
| | $d_{16}$ = 4.000 | $n_9$ = 1.49700 | $v_9$ = 81.54 |
| $r_{17}$ = −45.246 | | | |
| | $d_{17}$ = 0.120 | | |
| $r_{18}$ = 40.401 | | | |
| | $d_{18}$ = 3.300 | $n_{10}$ = 1.48749 | $v_{10}$ = 70.23 |
| $r_{19}$ = −392.693 | | | |
| | $d_{19}$ = 2.538 | | |
| $r_{20}$ = −43.283 | | | |
| | $d_{20}$ = 1.250 | $n_{11}$ = 1.84666 | $v_{11}$ = 23.78 |
| $r_{21}$ = −184.143 | | | |
| | $d_{21}$ = $D_3$ (variable) | | |
| $r_{22}$ = 42.736 | | | |
| | $d_{22}$ = 4.700 | $n_{12}$ = 1.49700 | $v_{12}$ = 81.54 |
| $r_{23}$ = −148.858 | | | |
| | $d_{23}$ = 4.519 | | |
| $r_{24}$ = 260.713 | | | |
| | $d_{24}$ = 1.650 | $n_{13}$ = 1.77250 | $v_{13}$ = 49.60 |
| $r_{25}$ = 63.915 | | | |
| | $d_{25}$ = 1.200 | | |
| $r_{26}$ = 73.603 | | | |
| | $d_{26}$ = 3.700 | $n_{14}$ = 1.51823 | $v_{14}$ = 58.90 |
| $r_{27}$ = −250.429 | | | |
| | $d_{27}$ = 0.150 | | |
| $r_{28}$ = 37.201 | | | |
| | $d_{28}$ = 4.400 | $n_{15}$ = 1.54814 | $v_{15}$ = 45.79 |
| $r_{29}$ = −189.167 | | | |
| | $d_{29}$ = 4.247 | | |
| $r_{30}$ = −169.429 (aspherical surface) | | | |
| | $d_{30}$ = 1.500 | $n_{16}$ = 1.83481 | $v_{16}$ = 42.72 |
| $r_{31}$ = 48.408 | | | | aspherical surface coefficients (30th surface) k = 0, $A_4$ = −1.2971 × 10⁻⁵, $A_6$ = −1.5590 × 10⁻⁹
$A_8$ = −3.7768 × 10⁻¹¹, $A_{10}$ = 1.5899 × 10⁻¹³

| f | 28.978 | 90.761 | 290.521 |
|---|---|---|---|
| $D_1$ | 0.901 | 20.696 | 36.668 |
| $D_2$ | 24.841 | 10.507 | 1.300 |
| $D_3$ | 21.195 | 7.819 | 0.900 |

$|f_2|/f_1$ = 0.182, h × z/Δ$D_{34}$ = 10.67, $D_4$/h = 0.2093
$f_{4F}/f_4$ = 1.04743, $f_{4F}/D_4$ = 14.9027

Embodiment 11 f = 28.979~90.620~290.373(mm),
F number = 4.877~6.546~7.592, 2ω = 76.6°~26.2°~8.4°,
$f_B$ = 37.974~80.858~138.073(mm)

| | | | |
|---|---|---|---|
| $r_1$ = 103.707 | | | |
| | $d_1$ = 2.800 | $n_1$ = 1.84666 | $v_1$ = 23.78 |
| $r_2$ = 61.129 | | | |
| | $d_2$ = 8.293 | $n_2$ = 1.48749 | $v_2$ = 70.23 |
| $r_3$ = −309.247 | | | |
| | $d_3$ = 0.100 | | |
| $r_4$ = 44.186 | | | |
| | $d_4$ = 6.000 | $n_3$ = 1.48749 | $v_3$ = 70.23 |
| $r_5$ = 155.661 | | | |
| | $d_5$ = $D_1$ (variable) | | |
| $r_6$ = 206.631 | | | |
| | $d_6$ = 1.600 | $n_4$ = 1.77250 | $v_4$ = 49.60 |
| $r_7$ = 17.847 | | | |
| | $d_7$ = 5.100 | | |
| $r_8$ = −50.115 | | | |
| | $d_8$ = 1.300 | $n_5$ = 1.77250 | $v_5$ = 49.60 |
| $r_9$ = 45.347 | | | |
| | $d_9$ = 0.100 | | |
| $r_{10}$ = 33.258 | | | |
| | $d_{10}$ = 4.650 | $n_6$ = 1.80518 | $v_6$ = 25.42 |
| $r_{11}$ = 23.529 | | | |
| | $d_{11}$ = 1.000 | $n_7$ = 1.78800 | $v_7$ = 47.37 |
| $r_{12}$ = −93.424 | | | |
| | $d_{12}$ = 1.055 | | |
| $r_{13}$ = −33.938 | | | |
| | $d_{13}$ = 1.200 | $n_8$ = 1.80400 | $v_8$ = 46.57 |
| $r_{14}$ = −389.312 | | | |
| | $d_{14}$ = $D_2$ (variable) | | |
| $r_{15}$ = ∞ (stop) | | | |
| | $d_{15}$ = 0.650 | | |
| $r_{16}$ = 60.767 | | | |
| | $d_{16}$ = 4.000 | $n_9$ = 1.49700 | $v_9$ = 81.54 |
| $r_{17}$ = −43.384 | | | |
| | $d_{17}$ = 0.120 | | |
| $r_{18}$ = 37.872 | | | |
| | $d_{18}$ = 3.800 | $n_{10}$ = 1.48749 | $v_{10}$ = 70.23 |
| $r_{19}$ = −128.796 | | | |
| | $d_{19}$ = 4.367 | | |
| $r_{20}$ = −41.712 | | | |
| | $d_{20}$ = 1.250 | $n_{11}$ = 1.84666 | $v_{11}$ = 23.78 |
| $r_{21}$ = −355.342 | | | |
| | $d_{21}$ = $D_3$ (variable) | | |
| $r_{22}$ = 102.938 | | | |
| | $d_{22}$ = 4.700 | $n_{12}$ = 1.48749 | $v_{12}$ = 70.23 |
| $r_{23}$ = −50.000 | | | |
| | $d_{23}$ = 1.200 | $n_{13}$ = 1.57501 | $v_{13}$ = 41.50 |
| $r_{24}$ = −57.088 | | | |
| | $d_{24}$ = 3.360 | | |
| $r_{25}$ = −68.395 | | | |
| | $d_{25}$ = 1.650 | $n_{14}$ = 1.77250 | $v_{14}$ = 49.60 |
| $r_{26}$ = −354.201 | | | |
| | $d_{26}$ = 1.200 | | |
| $r_{27}$ = 50.610 | | | |
| | $d_{27}$ = 3.700 | $n_{15}$ = 1.51823 | $v_{15}$ = 58.90 |
| $r_{28}$ = −868.113 | | | |
| | $d_{28}$ = 0.150 | | |
| $r_{29}$ = 43.388 | | | |
| | $d_{29}$ = 5.000 | $n_{16}$ = 1.54814 | $v_{16}$ = 45.79 |
| $r_{30}$ = −107.625 | | | |
| | $d_{30}$ = 5.223 | | |
| $r_{31}$ = −218.644 (aspherical surface) | | | |
| | $d_{31}$ = 1.500 | $n_{17}$ = 1.83481 | $v_{17}$ = 42.72 |
| $r_{32}$ = 45.449 | | | | aspherical surface coefficients (31st surface) k = 0, $A_4$ = −1.1729 × 10⁻⁵, $A_6$ = 6.7005 × 10⁻¹⁰
$A_8$ = −2.5767 × 10⁻¹¹, $A_{10}$ = 9.7483 × 10⁻¹⁴

| f | 28.979 | 90.620 | 290.373 |
|---|---|---|---|
| $D_1$ | 0.901 | 20.727 | 37.912 |
| $D_2$ | 23.449 | 9.723 | 1.300 |
| $D_3$ | 21.049 | 7.559 | 0.900 |

$|f_2|/f_1$ = 0.176, h × z/Δ$D_{34}$ = 10.53, $D_4$/h = 0.1606
$f_{4F}/f_4$ = 1.22456, $f_{4F}/D_4$ = 22.4409

Embodiment 12 f = 28.987~83.738~241.855(mm),
F number = 3.217~4.751~6.876, 2ω = 76.4°~28.0°~10.0°,
$f_B$ = 37.659~66.577~103.747(mm)

| | | | |
|---|---|---|---|
| $r_1$ = 95.785 | | | |
| | $d_1$ = 2.800 | $n_1$ = 1.84666 | $v_1$ = 23.78 |
| $r_2$ = 56.422 | | | |
| | $d_2$ = 8.300 | $n_2$ = 1.48749 | $v_2$ = 70.23 |
| $r_3$ = −325.187 | | | |
| | $d_3$ = 0.100 | | |
| $r_4$ = 42.469 | | | |
| | $d_4$ = 5.150 | $n_3$ = 1.48749 | $v_3$ = 70.23 |
| $r_5$ = 167.841 | | | |
| | $d_5$ = $D_1$ (variable) | | |
| $r_6$ = 111.063 | | | |
| | $d_6$ = 1.600 | $n_4$ = 1.77250 | $v_4$ = 49.60 |
| $r_7$ = 16.101 | | | |
| | $d_7$ = 5.000 | | |
| $r_8$ = −74.892 | | | |
| | $d_8$ = 1.300 | $n_5$ = 1.77250 | $v_5$ = 49.60 |
| $r_9$ = 46.973 | | | |
| | $d_9$ = 0.100 | | |
| $r_{10}$ = 27.898 | | | |
| | $d_{10}$ = 4.200 | $n_6$ = 1.80518 | $v_6$ = 25.42 |
| $r_{11}$ = −25.206 | | | |
| | $d_{11}$ = 1.000 | $n_7$ = 1.78800 | $v_7$ = 47.37 |
| $r_{12}$ = −367.346 | | | |
| | $d_{12}$ = 1.520 | | |
| $r_{13}$ = −26.653 | | | |
| | $d_{13}$ = 1.200 | $n_8$ = 1.81600 | $v_8$ = 46.62 |
| $r_{14}$ = −195.500 | | | |
| | $d_{14}$ = $D_2$ (variable) | | |
| $r_{15}$ = ∞ (stop) | | | |
| | $d_{15}$ = 0.650 | | |
| $r_{16}$ = 60.800 | | | |
| | $d_{16}$ = 4.200 | $n_9$ = 1.49700 | $v_9$ = 81.54 |
| $r_{17}$ = −40.057 | | | |
| | $d_{17}$ = 0.120 | | |
| $r_{18}$ = 35.528 | | | |
| | $d_{18}$ = 4.200 | $n_{10}$ = 1.48749 | $v_{10}$ = 70.23 |
| $r_{19}$ = −239.651 | | | |
| | $d_{19}$ = 2.000 | | |
| $r_{20}$ = −37.077 | | | |
| | $d_{20}$ = 1.250 | $n_{11}$ = 1.84666 | $v_{11}$ = 23.78 |
| $r_{21}$ = −125.446 | | | |
| | $d_{21}$ = $D_3$ (variable) | | |
| $r_{22}$ = 29.155 (aspherical surface) | | | |
| | $d_{22}$ = 5.000 | $n_{12}$ = 1.48749 | $v_{12}$ = 70.23 |
| $r_{23}$ = −133.855 | | | |
| | $d_{23}$ = 4.055 | | |
| $r_{24}$ = 250.000 | | | |
| | $d_{24}$ = 1.650 | $n_{13}$ = 1.74320 | $v_{13}$ = 49.34 |
| $r_{25}$ = 58.886 | | | |
| | $d_{25}$ = 0.524 | | |
| $r_{26}$ = 69.851 | | | |
| | $d_{26}$ = 4.200 | $n_{14}$ = 1.52249 | $v_{14}$ = 59.84 |
| $r_{27}$ = −117.719 | | | |
| | $d_{27}$ = 0.150 | | |
| $r_{28}$ = 41.707 | | | |
| | $d_{28}$ = 4.300 | $n_{15}$ = 1.53172 | $v_{15}$ = 48.84 |
| $r_{29}$ = −120.492 | | | |
| | $d_{29}$ = 2.000 | | |
| $r_{30}$ = −34.717 (aspherical surface) | | | |
| | $d_{30}$ = 1.500 | $n_{16}$ = 1.81600 | $v_{16}$ = 46.62 |
| $r_{31}$ = 149.827 | | | | aspherical surface coefficients (22nd surface) k = 0, $A_4$ = 5.2471 × 10$^{-6}$, $A_6$ = 2.0033 × 10$^{-8}$
$A_8$ = −9.4788 × 10$^{-11}$, $A_{10}$ = 3.9964 × 10$^{-13}$
(30th surface) k = 0, $A_4$ = −2.2126 × 10$^{-5}$, $A_6$ = −2.4760 × 10$^{-8}$
$A_8$ = −7.5236 × 10$^{-11}$, $A_{10}$ = 1.7118 × 10$^{-14}$

| f | 28.987 | 83.738 | 241.855 |
|---|---|---|---|
| $D_1$ | 0.901 | 21.270 | 36.370 |
| $D_2$ | 19.931 | 9.482 | 1.300 |
| $D_3$ | 12.035 | 4.279 | 0.900 |

Embodiment 12 f = 28.987~83.738~241.855(mm),
F number = 3.217~4.751~6.876, 2ω = 76.4°~28.0°~10.0°,
$f_B$ = 37.659~66.577~103.747(mm)

|$f_2$|/$f_1$ = 0.177, h × z/$\Delta D_{34}$ = 16.18, $D_4$/h = 0.1877
$f_{4F}$/$f_4$ = 0.83978, $f_{4F}$/$D_4$ = 12.2343 wherein reference symbols $r_1$, $r_2$, . . . represent radii of curvature on surfaces of respective lens elements, reference symbols $d_1$, $d_2$, . . . designate thicknesses of the respective lens elements and airspaces reserved therebetween, reference symbols $n_1$, $n_2$, . . . denote refractive indices of the respective lens elements, and reference symbols $v_1$, $v_2$, . . . represent Abbe's numbers of the respective lens elements. Furthermore, a reference symbol $f_B$ represents a back focal length. In the numerical data listed above, lengths such as r and d are specified in a unit of millimeter.

A zoom lens system preferred as the first embodiment of the present invention comprises a first positive lens unit G1, a second negative lens unit G2, a third positive lens unit G3 and a fourth positive lens unit G4 as shown in FIG. 1, which are moved as shown in FIG. 1 for zooming from a wide position (W) via an intermediate focal length (S) to a tele position (T). Speaking more concretely of a magnification change from the wide position to the tele position, the first lens unit G1 is moved toward the object side, the second lens unit G2 is moved so as to widen an airspace reserved between the first lens unit G1 and the second lens unit G2, the third lens unit G3 is moved so as to narrow an airspace reserved between the second lens unit G2 and the third lens unit G3, and the fourth lens unit G4 is moved so as to narrow an airspace reserved between the third lens unit G3 and the fourth lens unit G4.

Furthermore, the first lens unit G1 comprises an object side cemented lens component L11 which consists of a positive lens element and a negative lens element, and a positive lens element L12.

The second lens unit comprises, in order from the object side, a first lens component L21 having negative refractive power, a second lens component L22 having negative refractive power, a third lens component L23 having positive refractive power and a fourth lens component L24 having negative refractive power, and is configured to satisfy the condition (1) as described in the numerical data.

The third lens unit G3 comprises a lens component L31 which is disposed on the object side and has positive refractive power, and a negative lens element L32 which is disposed on the image side.

The fourth lens unit is composed, in order from the object side, of a front subunit G4F and a rear subunit G4R: the front subunit G4F having positive power, and the rear subunit G4R comprising an air lens which is formed between a positive lens element and a negative lens element and has meniscus shape convex toward the image side.

The second, third, fourth and fifth embodiments are zoom lens systems which have compositions similar to that of the first embodiment as shown in FIGS. 2, 3, 4 and 5 respectively.

Figure 6:
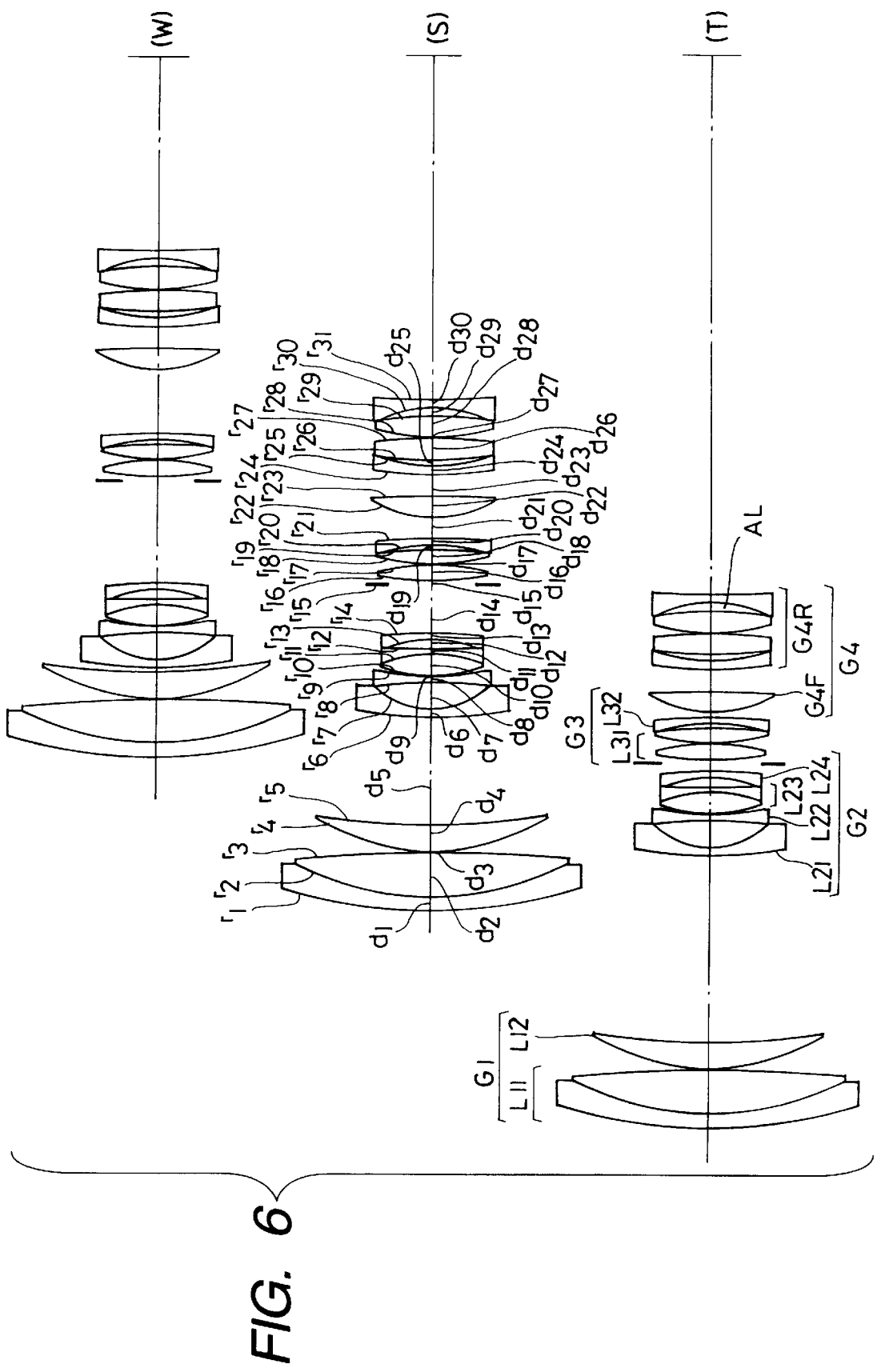

The sixth embodiment has a composition illustrated in FIG. 6 which is similar to that of the first embodiment, except for a lens component L23 of a second lens unit G2 which is configured as a cemented lens component consisting of a positive lens element and a negative lens element.

Figure 7:
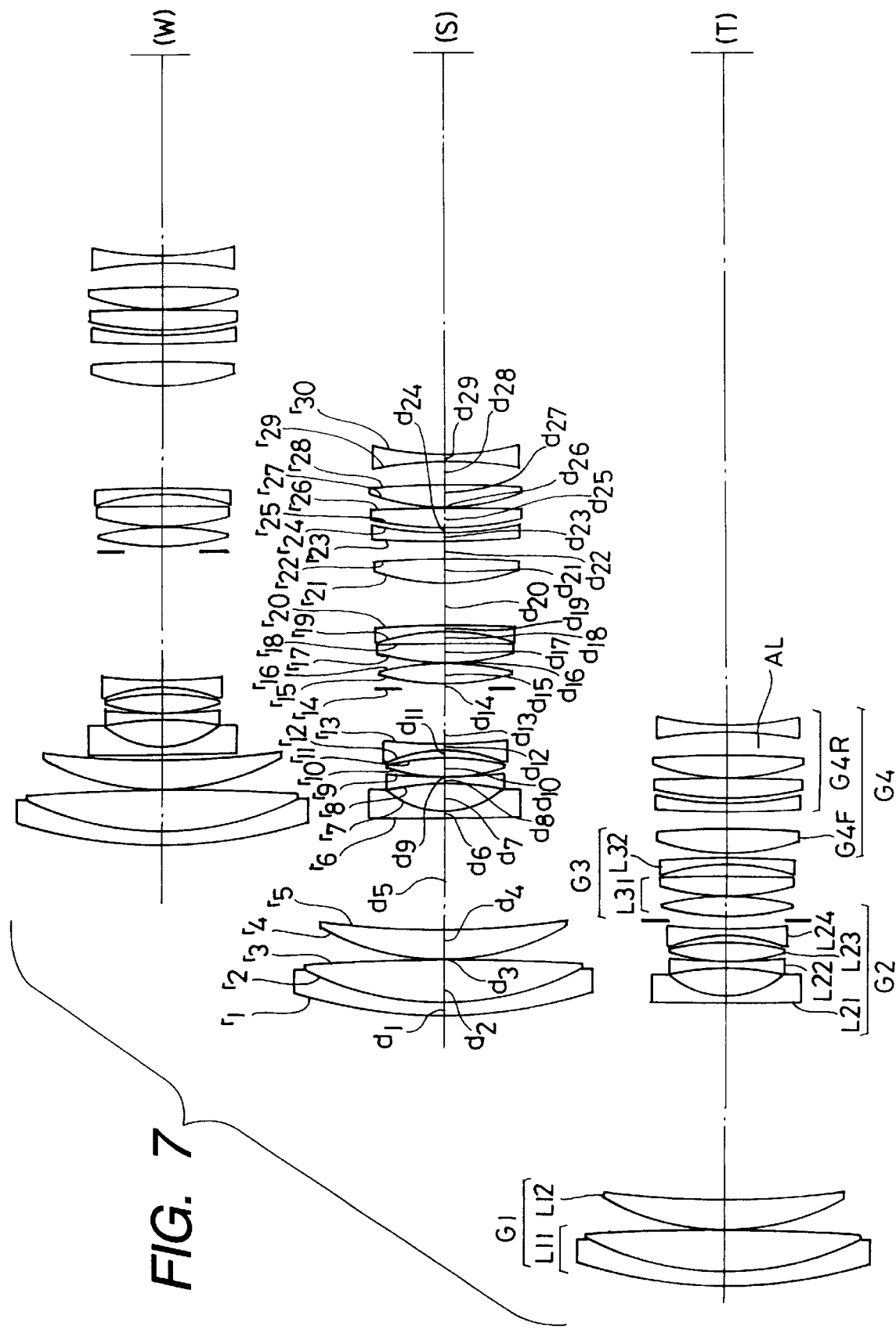

The seventh embodiment has a composition illustrated in FIG. 7 which is similar to that of the first embodiment.

Figure 8:
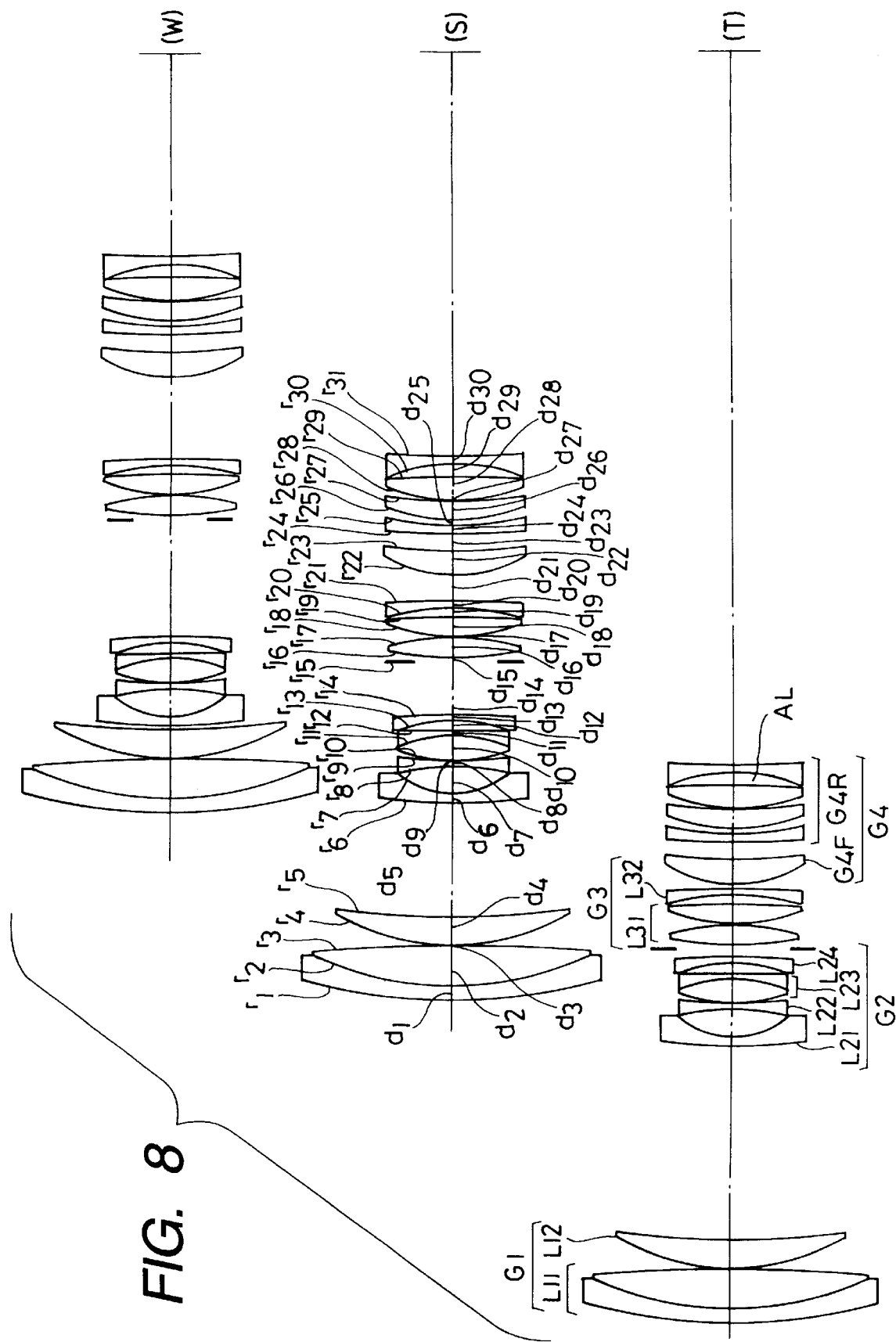
Figure 9:
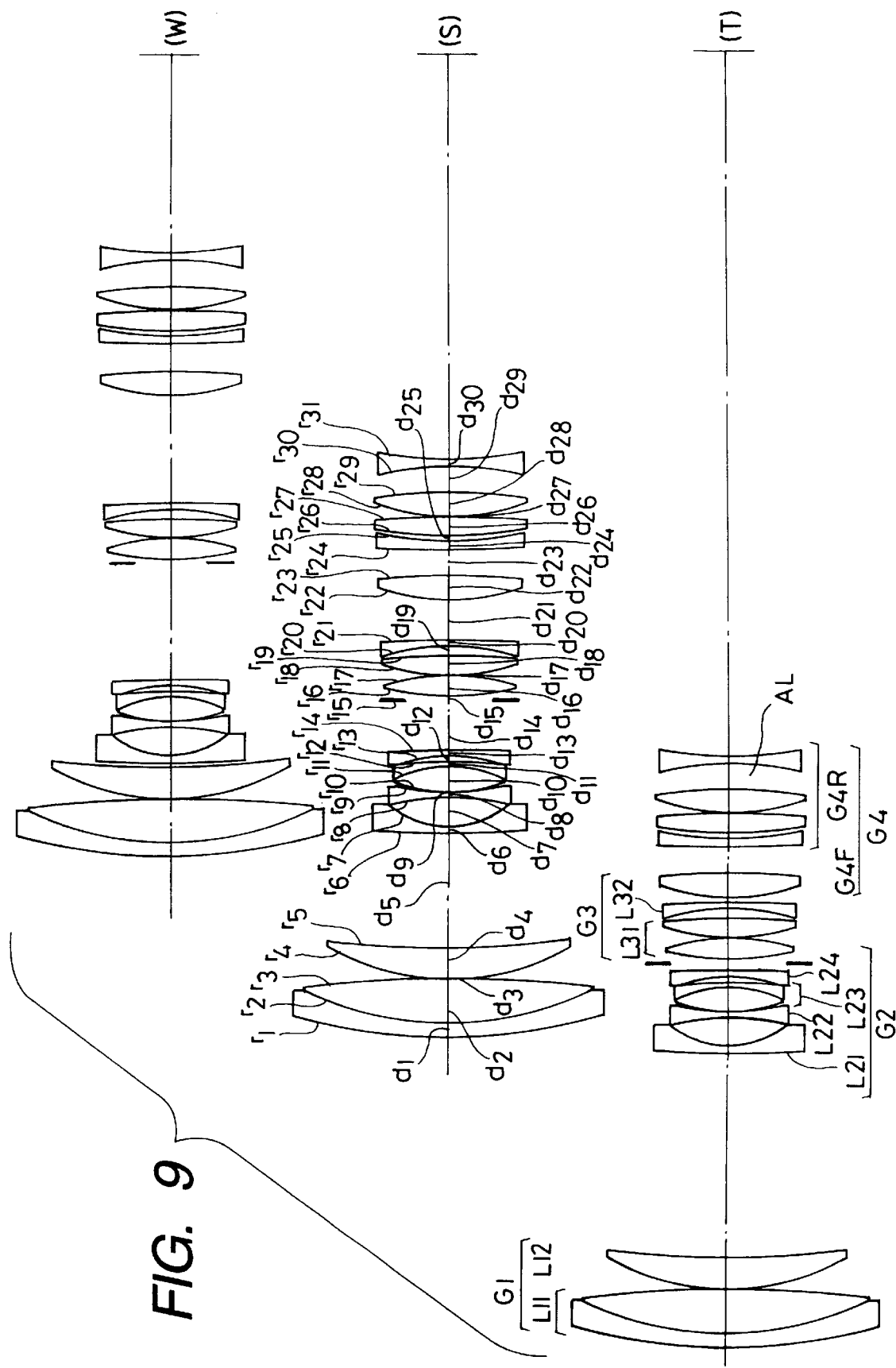
Figure 10:
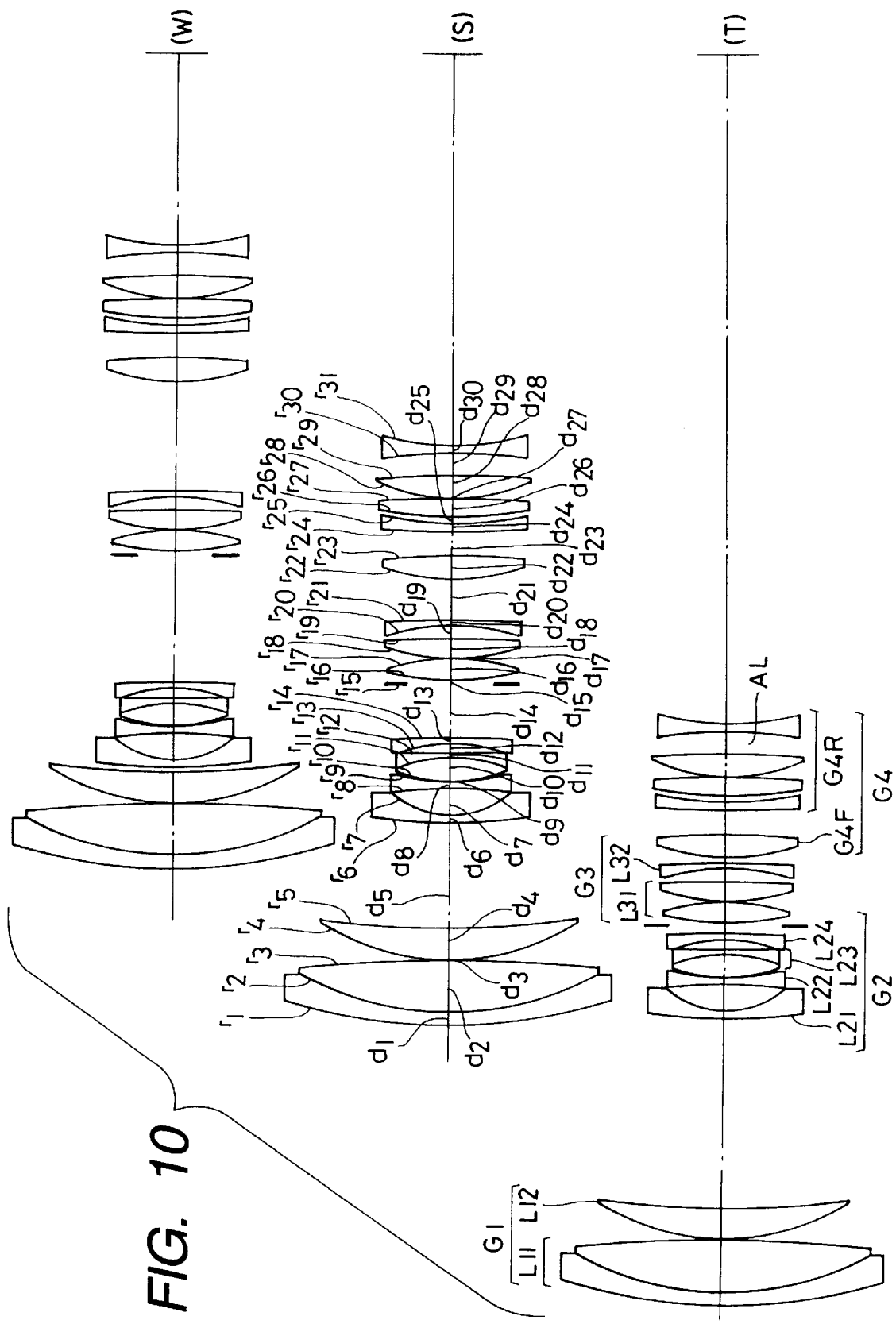

The eighth, ninth and tenth embodiments have composition illustrated in FIGS. 8, 9 and 10 which are similar to that of the sixth embodiment.

Figure 11:
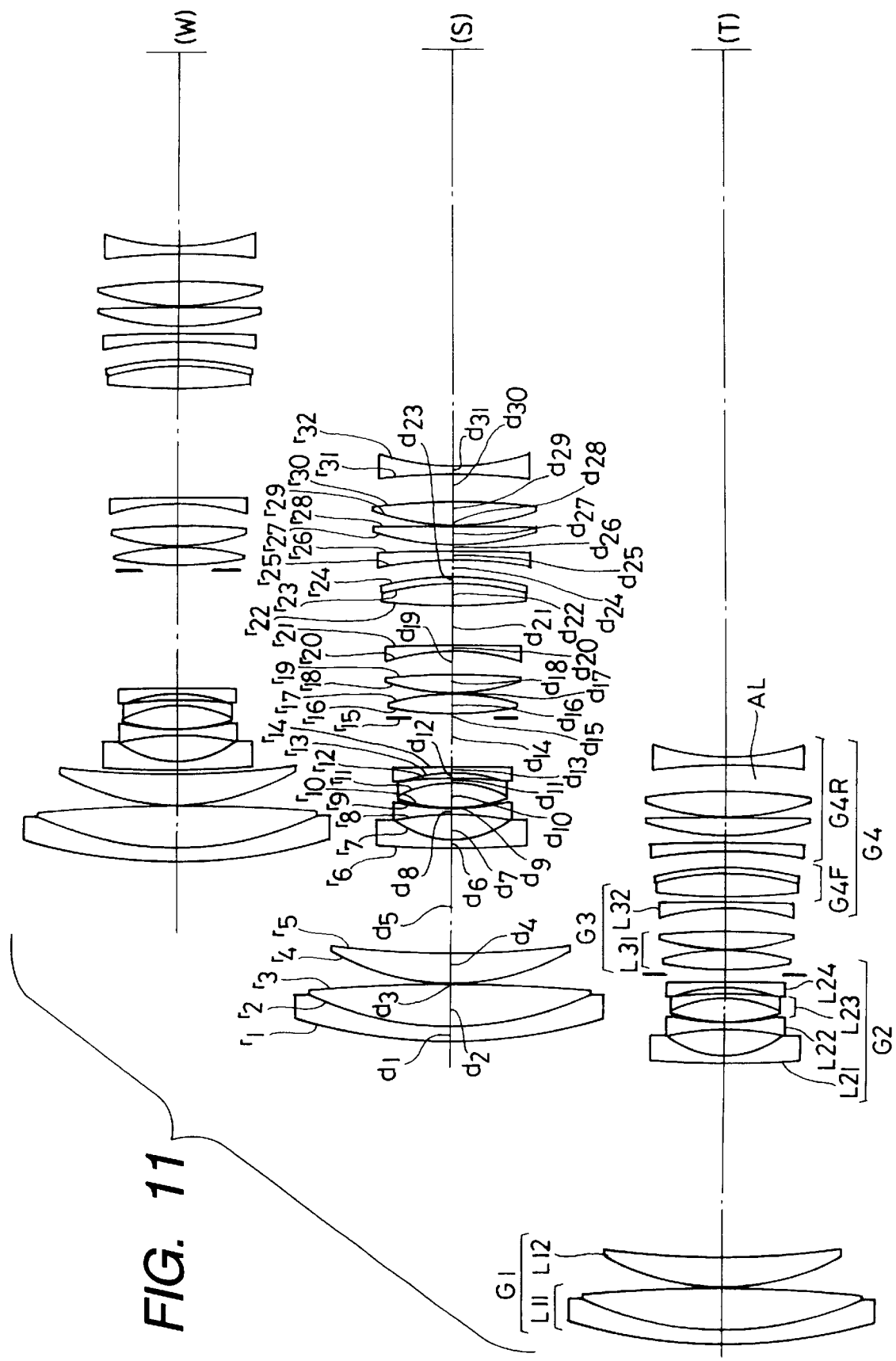

The eleventh embodiment is a lens system which is illustrated in FIG. 11 and has a composition similar to that of the sixth embodiment, except for a front subunit G4F of a fourth lens unit G4 which consists of two elements of a positive lens element and a negative lens element which are cemented to each other.

Figure 12:
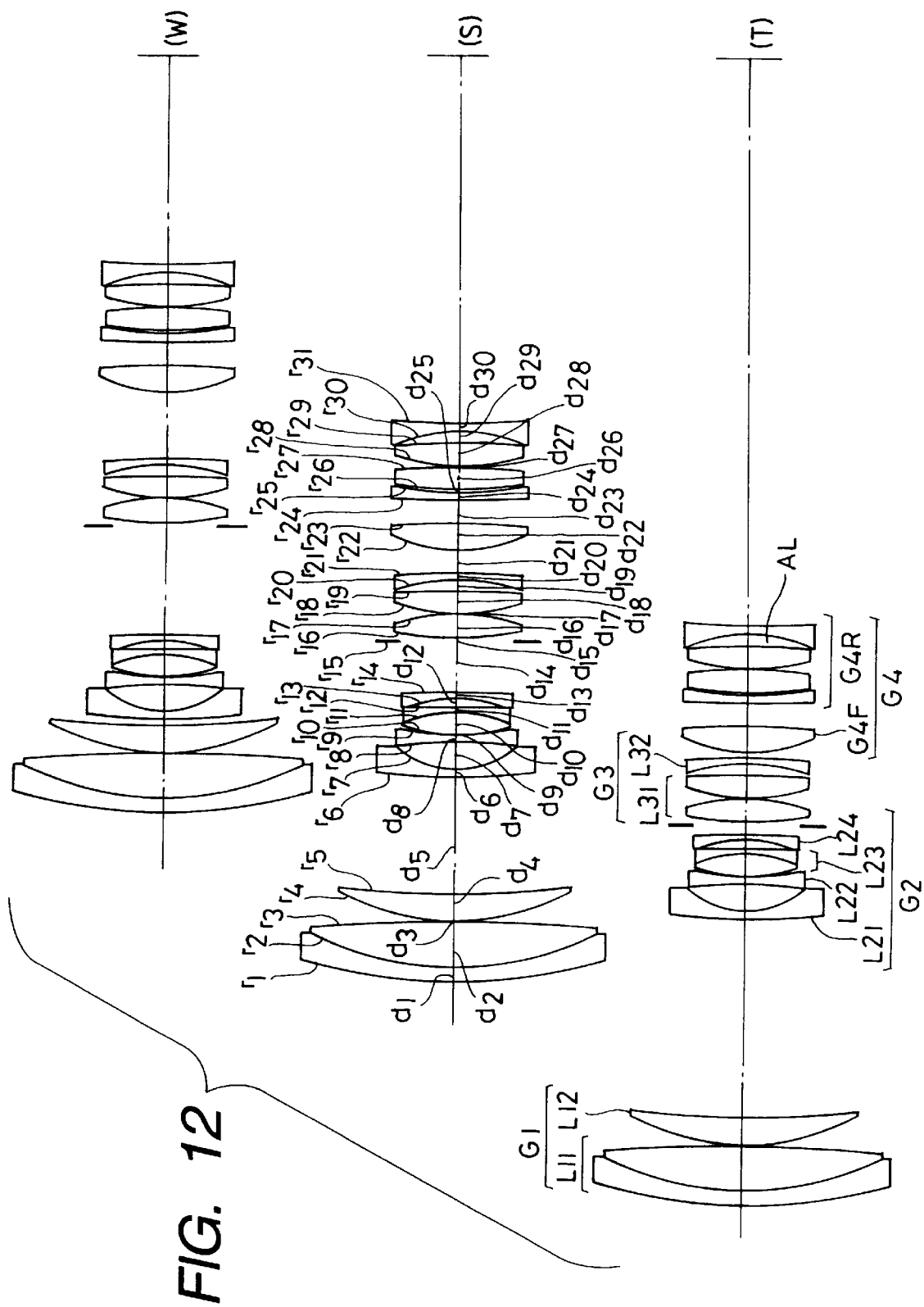
Figure 13:
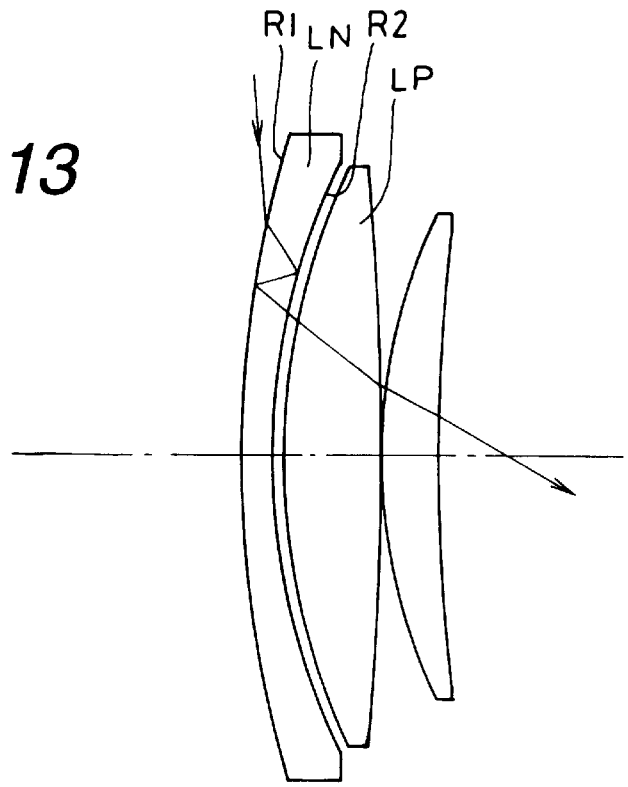
FIGS. 13 and 14 are diagrams descriptive of ghost in a first lens unit of the zoom lens system according to the present invention.

The twelfth embodiment is a zoom lens system having a composition illustrated in FIG. 12 which is similar to that of the sixth embodiment.

Figure 15:
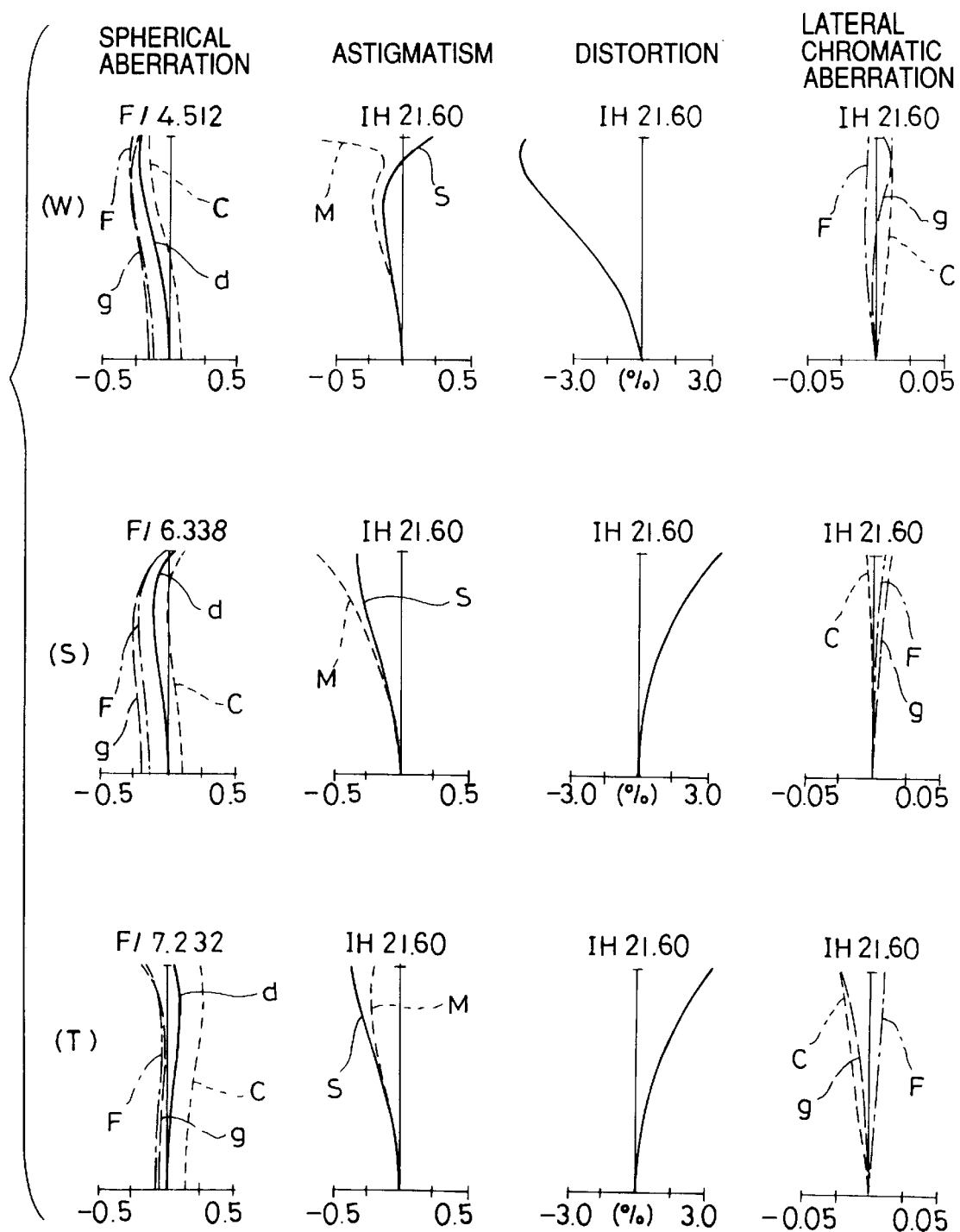
FIG. 15 is a graphs illustrating aberration characteristics of the first embodiment of the present invention.

Aberration characteristics of the zoom lens system preferred as the first embodiment are illustrated in FIG. 15, wherein a reference symbol (W) at an upper stage represents a wide position, a reference symbol (S) at a middle stage designates an intermediate focal length and a reference symbol (T) at a lower stage denotes a tele position. A reference symbol 1H in FIG. 15 represents an image height. Like the first embodiment, the other embodiments correct aberrations favorably over entire vari-focal regions.

The present invention makes it possible to obtain a zoom lens system which has a high vari-focal ratio of 6 or higher and exhibits favorable optical performance.

The zoom lens system according to the present invention can be configured to form an image of an object, for example, on an image pickup device such as a photographic film or CCD (solid-state image pickup device) and used in an image pickup apparatus.

Figure 16:
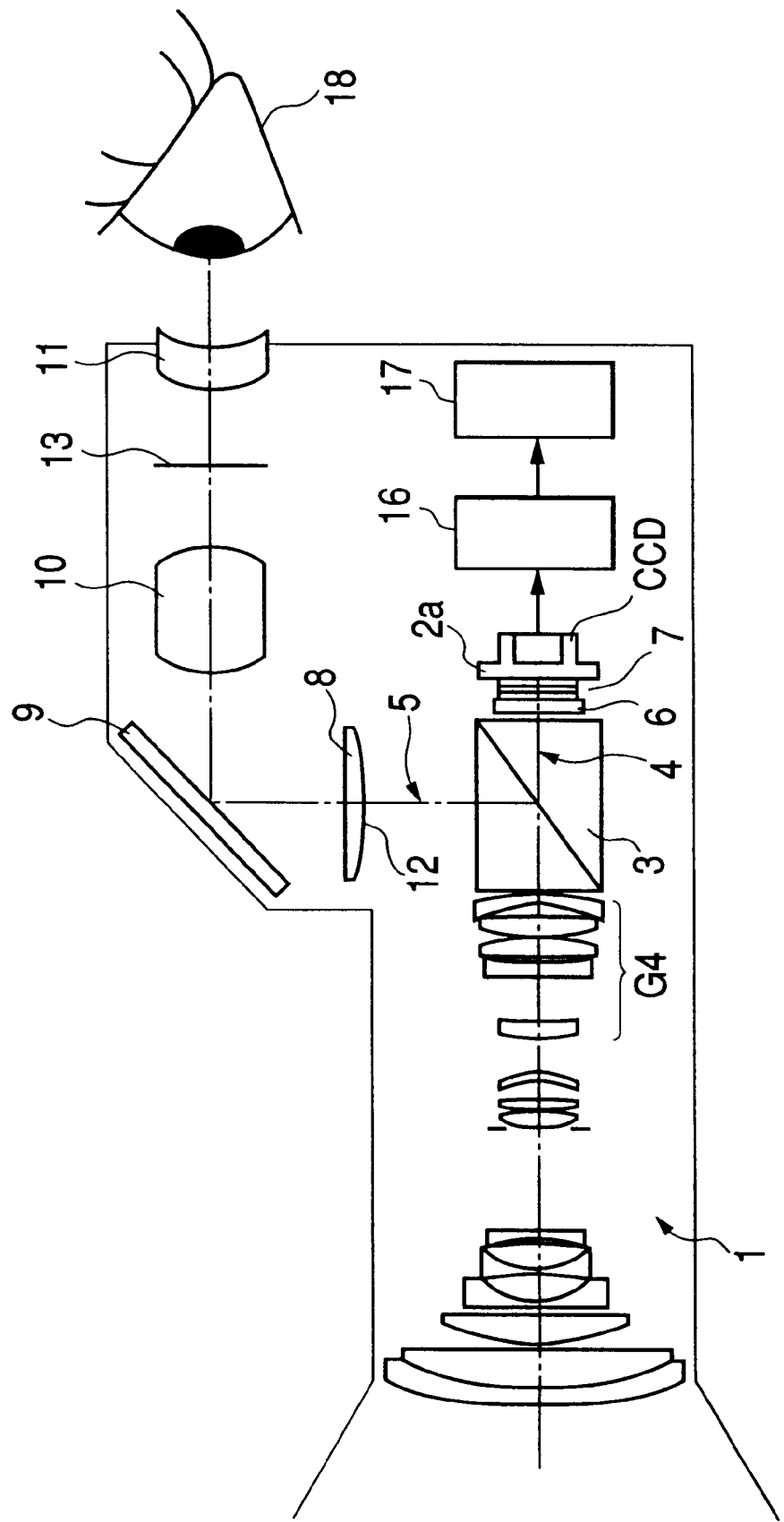
FIG. 16 is a diagram illustrating a configuration of a single-lens reflex camera which uses the zoom lens system according to the present invention.

FIG. 16 shows a single-lens reflex camera which uses the zoom lens system according to the present invention as an example of image pickup apparatus using the zoom lens system according to the present invention.

The camera shown in FIG. 16 comprises optical path splitting means 3 which is disposed between a fourth lens unit G4 and an imaging surface 2a of a zoom lens system 1 according to the present invention, and uses one of an optical path 4 and another optical path 5 split by the optical path splitting means 3 as a photographing optical path and an observing optical path respectively.

The camera shown in FIG. 16 uses a beam splitter as the optical path splitting means 3, and comprises a low pass filter 6 and an infrared cut filter 7 which are disposed in a photographing optical path 4 between the beam splitter (optical path splitting means) 3 and an image pickup device 2. Accordingly, a light bundle which has transmitted through the beam splitter 3, the low pass filter 6 and the infrared cut filter 7 forms an image of an object on an imaging surface 2a on a CCD which is adopted as the image pickup device 2.

The image which is formed on the image pickup device (CCD) 2 is converted into electric signals, supplied by way of processing means 16 and electrically recorded on recording means 17 such as a PC card, a DVD or a video tape.

On the other hand, disposed in the observing optical path 5 are a screen mat 8, reflecting mirror 9, a relay optical system 10 and an eyepiece 11, whereby rays reflected by the beam slitter 8 form a primary image on the screen mat 8, and are reflected by the reflecting mirror 9 and used by the relay optical system 10 to form a secondary image which is observed by an observer through the eyepiece 11.

In the camera shown in FIG. 16, a quick return mirror may be used in place of the beam splitter as the beam splitting means 3 and a pentagonal roof prism may be used in place of the relay optical system to erect the image. Furthermore, a CMD or a photographic film may be used in place of the CCD as the image pickup device 2.

In addition, the zoom lens system according to the present invention can be used not only as a photographic lens system for camera but also as an objective lens for view finders and a photographic lens system for image pickup devices of portable telephones and note type personal computers.

What is claimed is:

1. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to reserve an airspace between said third lens unit and said fourth lens unit which is narrower at the tele position than an airspace at the wide position, wherein said second lens unit comprises a first lens component having negative refractive power, a second lens component having negative refractive power, a third lens component having positive refractive power and a fourth lens unit having negative refractive power which are disposed independently with airspace reserved therebetween, wherein said third lens unit comprises a lens component which is disposed on the most object side and has positive refractive power, and a negative lens element which is disposed independently on the most image side with an airspace interposed, wherein said fourth lens unit comprises a front subunit and a rear subunit, said front subunit has positive power, and said rear subunit comprises a positive lens element, a negative lens element, and an air lens formed between said positive lens element and said negative lens element so as to have a meniscus shape convex toward the image side, and wherein said zoom lens system satisfies the following conditions (1) and (2):

(1) $0.16 < |f_2|/f_1 < 0.23$ (2) $5 < h \times z/\Delta D_{34} < 27$ wherein a reference symbol $f_1$ represents a focal length of the first lens unit, a reference symbol $f_2$ designates a focal length of the second lens unit, a reference symbol h denotes a maximum height on an imaging surface, a reference symbol z represents a vari-focal ratio and a reference symbol $\Delta D_{34}$ designates a difference between an airspace between the third lens unit and the fourth lens unit at the wide position and an airspace between the third lens unit and the fourth lens unit at the tele position.

2. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to reserve an airspace between said third lens unit and said fourth lens unit at the tele position which is narrower than an airspace at the wide position, wherein said second lens unit comprises, in order from the object side, a first lens component having negative refractive power, a second lens component having negative refractive power, a third lens component having positive refractive power and a fourth lens component having negative refractive power which are disposed independently with airspace reserved therebetween, wherein said third lens unit comprises a lens component which is disposed on the most object side and has positive refractive power and a negative lens element which is disposed on the most image side independently with an airspace interposed, wherein said fourth lens unit comprises a front subunit and a rear subunit, said front subunit has positive power, and a rear subunit which comprises a positive lens element, a negative lens element and an air lens formed between said positive lens element and said negative lens element so as to have a meniscus shape convex toward the image side, and wherein said zoom lens system satisfies the following conditions (1) and (3):

(1) $0.16<|f_2|/f_1<0.23$ (3) $0.09<D_4/h<0.6$ wherein a reference symbol $f_1$ represents a focal length of the first lens unit, a reference symbol $f_2$ designates a focal length of the second lens unit, a reference symbol h denotes a maximum height on an imaging surface, a reference symbol $D_4$ represents an airspace between an image side surface of the front subunit and an object side surface of the rear subunit.

3. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to reserve an airspace between said third lens unit and said fourth lens unit at the tele position which is narrower than an airspace at the wide position, wherein said second lens unit comprises, in order from the object side, a first lens component having negative refractive power, a second lens component having negative refractive power, a third lens component having positive refractive power and a fourth lens component having negative refractive power which are disposed independently with airspace reserved therebetween, wherein said third lens unit comprises a lens component which is disposed on the most object side and has positive refractive power, and an independent negative lens element which is disposed on the most image side with airspaces reserved on the object side and the image side, wherein said fourth lens unit comprises a front subunit and a rear subunit, said front subunit has positive power, and said rear subunit comprises a positive lens element, a negative lens element and an air lens formed between said positive lens element and said negative lens element so as to have a meniscus shape convex toward the image side, and wherein said zoom lens system satisfies the following conditions (1), (4) and (5):

(1) $0.16<|f_2|<1.8$ (4) $0.6<f_{4F}/f_4<1.8$ (5) $4<f_{4F}/D_4<35$ wherein a reference symbol $f_2$ designates a focal length of the second lens unit, a reference symbol $f_4$ represents a focal length of the fourth lens unit, a reference symbol $f_{4F}$ designates a focal length of the front subunit of the fourth lens unit and a reference symbol $D_4$ denotes an airspace between an image side surface of said front subunit and an object side surface of said rear subunit.

4. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to reserve an airspace between said third lens unit and said fourth lens unit at the tele position which is wider than an airspace at the wide position, wherein said second lens unit comprises, in order from the object side, a first lens component having negative refractive power, a second lens component having negative refractive power, a third lens component having positive refractive power and a fourth lens component having negative refractive power which are disposed independently with airspace reserved therebetween, wherein said third lens unit comprises a lens component which is disposed on the most object side and has positive refractive power, and an independent negative lens element which is disposed on the most image side with airspaces reserved on the object side and the image side, wherein said fourth lens unit comprises a front subunit and a rear subunit, said front subunit consists of a single lens element having a convex object side surface and positive power, and said rear subunit comprises a positive lens element, a negative lens element and an air lens formed between said positive lens element and said negative lens element so as to have a meniscus shape convex forward the image side, and wherein said zoom lens system satisfies the following condition (1):

(1) $0.16<|f_2|/f_1<0.23$ wherein a reference symbol $f_1$ represents a focal length of the first lens unit, a reference symbol $f_2$ designate a focal length of the second lens unit.

5. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to reserve an airspace between said third lens unit and said fourth lens unit at the tele position which is narrower than an airspace at the wide position, wherein said second lens unit comprises, in order from the object side, a lens component having negative refractive power, a second lens component having negative refractive power, a third lens component having positive refractive power and a fourth lens component having negative refractive power, wherein said third lens unit comprises a lens component which is disposed on the object side and has positive refractive power, and an independent negative lens element which is disposed on the image side with airspaces reserved on the object side and the image side, wherein said fourth lens unit comprises a front subunit and a rear subunit, said front subunit has positive power, and said rear subunit comprises a positive lens element, a negative lens element and an air lens formed between said positive lens element and said negative lens element so as to have a meniscus shape convex toward the image side, wherein the third lens component of said second lens unit is a cemented lens component consisting of a positive lens element and a negative lens element, and wherein said zoom lens system satisfies the following condition (1):

(1) $0.16<|f_2|/f_1<0.23$ wherein a reference symbol $f_1$ represents a focal length of the first lens unit, a reference symbol $f_2$ designate a focal length of the second lens unit.

6. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to reserve an airspace between said third lens unit and said fourth lens unit which is narrower than an airspace at the wide position, wherein said second lens unit comprises, in order from the object side, a first lens component having negative refractive power, a second lens component having negative refractive power, a third lens component having positive refractive power and a fourth lens component having negative refractive power, wherein said fourth lens unit comprises a front subunit a rear subunit, said front subunit comprises a lens element having positive power and a negative lens element disposed after the lens element and in the vicinity thereof, and said rear subunit surfaces of the lens element having the positive power and the negative lens element of said front subunit which are opposed to each other have radii of curvature of the same sign, and wherein said zoom lens system satisfies the following condition (1)

(1) $0.16<|f_2|/f_1<0.23$ wherein a reference symbol $f_1$ represents a focal length of the first lens unit, a reference symbol $f_2$ designate a focal length of the second lens unit.

7. The zoom lens system according to claim 4 or 6 satisfying the following condition (6):

(6) $v_d>60$ wherein a reference symbol $v_d$ represents an Abbe's number of the positive lens element disposed in the front subunit of the fourth lens unit.

8. The zoom lens system according to claim 7, wherein said first lens unit comprises a cemented lens component which is disposed on the object side, and consists, in order from the object side, of a negative lens element and a positive lens element.

9. The zoom lens system according to claim 1, 2, 3, 4, 5 or 6, wherein said first lens unit comprises a cemented lens component which is disposed on the object side, and consists, in order from the object side, of a negative lens element and a positive lens element.

10. The zoom lens system according to claim 1, 3 or 5, wherein the front subunit of said fourth lens unit comprises a lens element having positive power and satisfies the following condition (6):

(6) $v_d>60$ wherein a reference symbol $v_d$ represents an Abbe's number of the positive lens element disposed in the front subunit of the fourth lens unit.

11. A zoom lens system comprising in order from the object side: a first lens unit having positive refractive power; a second lens unit having negative refractive power; a third lens unit having positive refractive power; and a fourth lens unit having positive refractive power, wherein a magnification at a wide position is changed to a magnification at a tele position by moving said first lens unit toward the object side, moving said second lens unit so as to widen an airspace reserved between said first lens unit and said second lens unit, moving said third lens unit so as to narrow an airspace reserved between said second lens unit and said third lens unit and moving said fourth lens unit so as to narrow an airspace reserved between said third lens unit and said fourth lens unit, wherein said second lens unit comprises, in order from the object side, a first lens component having negative refractive power, a second lens component having negative refractive power, a third lens component having positive refractive power and a fourth lens component having negative refractive power, wherein said first lens unit comprises a cemented lens component which is disposed on the object side, and consists of, in order from the object side, a negative lens element and a positive lens element, and wherein said zoom lens system satisfies the following condition (1):

(1) $0.16<|f_2|/f_1<0.23$ wherein a reference symbol $f_1$ represents a focal length of the first lens unit, a reference symbol $f_2$ designate a focal length of the second lens unit.

12. The zoom lens system according to claim 1, 2, 3, 4, 5, 6 or 11 having a vari-focal ration of 6 or higher.

13. The zoom lens system according to claim 1, 2, 3, 4, 5, 6 or 11 having a field angle of 68° or larger at the wide position.

14. An image pickup apparatus comprising optical path splitting means which is disposed between the fourth lens unit of the zoom lens system according to claim 1, 2, 3, 4, 5, 6 or 11 and an imaging surface of said zoom lens system, one of optical paths split by said optical path splitting means used as a photographing optical path and another optical path is used as an observing optical path.

* * * * *